(12) United States Patent
Vosseller et al.

(10) Patent No.: US 12,632,862 B2
(45) Date of Patent: *May 19, 2026

(54) COSIGNING USING TOKENIZED REPUTATION SCORES

(71) Applicant: eBay Inc., San Jose, CA (US)

(72) Inventors: Shannon Bruce Vosseller, San Francisco, CA (US); Andrew Chalkley, Milwaukie, OR (US)

(73) Assignee: eBay Inc., San Jose, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 18/790,705

(22) Filed: Jul. 31, 2024

(65) Prior Publication Data

US 2024/0394704 A1 Nov. 28, 2024

Related U.S. Application Data

(63) Continuation of application No. 17/518,820, filed on Nov. 4, 2021, now Pat. No. 12,100,001.

(51) Int. Cl.
| | |
|---|---|
| *G06Q 10/10* | (2023.01) |
| *G06Q 10/06* | (2023.01) |
| *G06Q 20/38* | (2012.01) |
| *G06Q 20/40* | (2012.01) |
| *G06Q 30/02* | (2023.01) |
| *G06Q 30/06* | (2023.01) |

(52) U.S. Cl.
CPC ....... *G06Q 20/401* (2013.01); *G06Q 20/3821* (2013.01); *G06Q 2220/00* (2013.01)

(58) Field of Classification Search
CPC ............. G06Q 20/401; G06Q 20/3821; G06Q 2220/00; G06Q 20/405; G06Q 30/018; G06Q 20/065; G06Q 20/4016

USPC ...................... 705/1.1–912, 26.3, 26.35, 317
See application file for complete search history.

(56) References Cited

U.S. PATENT DOCUMENTS

| | | |
|---|---|---|
| 8,194,550 B2 | 6/2012 | Shorey et al. |
| 8,719,154 B2 | 5/2014 | Shastry et al. |
| 10,268,829 B2 | 4/2019 | Roets et al. |
| 10,546,296 B2 | 1/2020 | Narasimhan et al. |
| 11,133,936 B1 | 9/2021 | Branton |

(Continued)

FOREIGN PATENT DOCUMENTS

| | | |
|---|---|---|
| WO | WO-2015191741 | 12/2015 |

OTHER PUBLICATIONS

U.S. Appl. No. 17/492,924, Oct. 31, 2024 , "Examiner's Answer", U.S. Appl. No. 17/492,924, Oct. 31, 2024, 10 pages.

(Continued)

*Primary Examiner* — Jonathan P Ouellette
(74) *Attorney, Agent, or Firm* — FIG. 1 Patents

(57) ABSTRACT

Techniques are described, as implemented by computing devices, to control access to transactions through use of cosigning based on tokenized reputation scores. This is performed by leveraging a blockchain such that tokenized reputation scores are generated based on amounts of cryptographic reputation tokens associated with blockchain account addresses associated with applicant and co-signer service provider accounts. Transactional functionality is made available to an applicant service provider account having an insufficient tokenized reputation score by using a co-signer service provider account having a sufficient tokenized reputation score to at least partially back an obligation of the applicant service provider for a transaction.

20 Claims, 9 Drawing Sheets

(56) References Cited

U.S. PATENT DOCUMENTS

| | | |
|---|---|---|
| 11,165,787 B2 | 11/2021 | Sloane et al. |
| 11,392,947 B1 | 7/2022 | Prasad et al. |
| 11,449,819 B2 | 9/2022 | Heath et al. |
| 11,652,604 B2 | 5/2023 | Gundavelli et al. |
| 11,748,746 B2 | 9/2023 | Pillai et al. |
| 11,748,793 B2 | 9/2023 | Vosseller et al. |
| 11,861,400 B2 | 1/2024 | Wentz |
| 11,922,453 B2 | 3/2024 | Vlahovic et al. |
| 11,983,610 B2 | 5/2024 | Poletti et al. |
| 12,100,001 B2 | 9/2024 | Vosseller et al. |
| 12,154,151 B2 | 11/2024 | Vosseller et al. |
| 2006/0184440 A1 | 8/2006 | Britti et al. |
| 2009/0006115 A1 | 1/2009 | Schwarz |
| 2010/0201543 A1 | 8/2010 | Shorey et al. |
| 2011/0106643 A1 | 5/2011 | Berkowitz |
| 2014/0236749 A1 | 8/2014 | Yang |
| 2015/0356630 A1 | 12/2015 | Hussain |
| 2017/0011395 A1 | 1/2017 | Pillai et al. |
| 2017/0140394 A1 | 5/2017 | Cao et al. |
| 2017/0300912 A1 | 10/2017 | Narasimhan et al. |
| 2017/0364920 A1 | 12/2017 | Anand |
| 2019/0095631 A1 | 3/2019 | Roets et al. |
| 2019/0303807 A1 | 10/2019 | Gueye |
| 2019/0312734 A1 | 10/2019 | Wentz et al. |
| 2020/0027089 A1 | 1/2020 | Kuchar et al. |
| 2020/0034457 A1 | 1/2020 | Brody et al. |
| 2020/0052917 A1 | 2/2020 | Corral et al. |
| 2020/0067696 A1 | 2/2020 | Sarin |
| 2020/0162261 A1 | 5/2020 | Iyer |
| 2020/0219150 A1 | 7/2020 | Johnston |
| 2020/0313897 A1 | 10/2020 | Heath et al. |
| 2020/0410460 A1 | 12/2020 | Nissan et al. |
| 2021/0064780 A1 | 3/2021 | Riedel et al. |
| 2021/0067518 A1 | 3/2021 | Sloane et al. |
| 2021/0160082 A1 | 5/2021 | Wang |
| 2021/0174247 A1 | 6/2021 | Poletti et al. |
| 2021/0176340 A1 | 6/2021 | Rose et al. |
| 2021/0390531 A1 | 12/2021 | Voorhees et al. |
| 2022/0150050 A1 | 5/2022 | Gundavelli et al. |
| 2023/0103398 A1 | 4/2023 | Vosseller et al. |
| 2023/0108817 A1 | 4/2023 | Vosseller et al. |
| 2023/0108983 A1 | 4/2023 | Vosseller et al. |
| 2023/0113795 A1 | 4/2023 | Vlahovic et al. |
| 2023/0135294 A1 | 5/2023 | Vosseller et al. |
| 2023/0360097 A1 | 11/2023 | Vosseller et al. |
| 2024/0169388 A1 | 5/2024 | Vlahovic et al. |

OTHER PUBLICATIONS

U.S. Appl. No. 18/223,232, Nov. 1, 2024 , "Corrected Notice of Allowability", U.S. Appl. No. 18/223,232, Nov. 1, 2024, 11 pages.

"A group of experts intends to sell the Colosseum . . . in digital format", Translated by ContentEngine LLC. CE Noticias Financieras, English ed. [Miami], Jul. 27, 2021, 2 pages.

"Blockchain Video Platform Viuly.io Connects to Ethereum Mainnet", Cision, PR Newswire [retrieved Mar. 28, 2023]. Retrieved from the Internet <https://www.prnewswire.com/news-releases/blockchain-video-platform-viulyio-connects-to-ethereum-mainnet-300589200.html>, Jan. 27, 2018, 4 pages.

"The genesis, vision and what makes Decentralized Reputation System", M2 Presswire [Coventry] Retrieved from the Internet <http://www.m2.com>, Jun. 1, 2018, 3 pages.

U.S. Appl. No. 17/492,894, Jun. 22, 2023, , "Corrected Notice of Allowability", U.S. Appl. No. 17/492,894, Jun. 22, 2023, 11 pages.

U.S. Appl. No. 17/492,894, Mar. 28, 2023, , "Non-Final Office Action", U.S. Appl. No. 17/492,894, Mar. 28, 2023, 26 pages.

U.S. Appl. No. 17/492,894, Jun. 7, 2023, , "Notice of Allowance", U.S. Appl. No. 17/492,894, Jun. 7, 2023, 13 pages.

U.S. Appl. No. 17/492,924, Apr. 11, 2024, , "Final Office Action", U.S. Appl. No. 17/492,924, Apr. 11, 2024, 20 pages.

U.S. Appl. No. 17/492,924, Aug. 15, 2023, , "Final Office Action", U.S. Appl. No. 17/492,924, Aug. 15, 2023, 24 pages.

U.S. Appl. No. 17/492,924, Dec. 20, 2023, , "Non-Final Office Action", U.S. Appl. No. 17/492,924, Dec. 20, 2023, 22 pages.

U.S. Appl. No. 17/492,924, Mar. 14, 2023, , "Non-Final Office Action", U.S. Appl. No. 17/492,924, Mar. 14, 2023, 24 pages.

U.S. Appl. No. 17/518,820, Jan. 19, 2024, , "Non-Final Office Action", U.S. Appl. No. 17/518,820, Jan. 19, 2024, 17 pages.

U.S. Appl. No. 17/518,820, Jun. 6, 2024, , "Notice of Allowance", U.S. Appl. No. 17/518,820, Jun. 6, 2024, 8 pages.

U.S. Appl. No. 18/223,232, Sep. 25, 2024, , "Notice of Allowance", U.S. Appl. No. 18/223,232, Sep. 25, 2024, 16 pages.

Abdo, et al., "Permissionless reputation-based consensus algorithm for blockchain", Internet Technology Letters, 3(3), e151, Retrieved from Internet URL: https://doi.org/10.1002/it12.151, Apr. 10, 2020, 6 Pages.

Ahn, Jaehong et al., "A Model for Deriving Trust and Reputation on Blockchain-Based e-Payment System", Applied Sciences, vol. 9, No. 24 [retrieved Mar. 28, 2023]. Retrieved from the Internet <https://doi.org/10.3390/app9245362>, Dec. 8, 2019, 18 pages.

Eckhardt, Giana M. , "Playing the Trust Game Successfully in the Reputation Economy", Volume & Issue: vol. 12, No. 2 [retrieved Mar. 28, 2023]. Retrieved from the Internet <https://doi.org/10.2478/nimmir-2020-0011>, Oct. 22, 2020, 8 pages.

Khairuddin, Irni E. , "Understanding and Designing for Trust in Bitcoin Blockchain", Lancaster University, School of Computing and Communications [retrieved Mar. 28, 2023]. Retrieved from the Internet <https://core.ac.uk/download/pdf/227519686.pdf>, Apr. 2019, 350 pages.

Levin, Richard B. et al., "Bitcoin Investment Vehicles Beware—The SEC is Watching", BakerHostetler Blog, Baker & Hostetler LLP [retrieved Jun. 7, 2023]. Retrieved from the Internet <https://www.bakerlaw.com/alerts/bitcoin-investment-vehicles-beware-the-sec-is-watching>, Jun. 24, 2014, 3 pages.

Brown, et al., "Reputation in Online Auctions: The Market for Trust", California Management Review, vol. 49, No. 1, 2006, 22 pages.

Notice of Allowance issued in U.S. Appl. No. 17/492,924, mailed Dec. 30, 2025, 10 pages.

Sun, et al., "A Privacy-Preserving and Robust Reputation System Based on Blockchain", 2019 IEEE Conference on Parallel and Distribution Processing with Applications, Big Data & Cloud Computing, Sustainable Computing & Communications, Social Computing & Networking, 2019, 6 pages.

400

600

700

Figure 8:
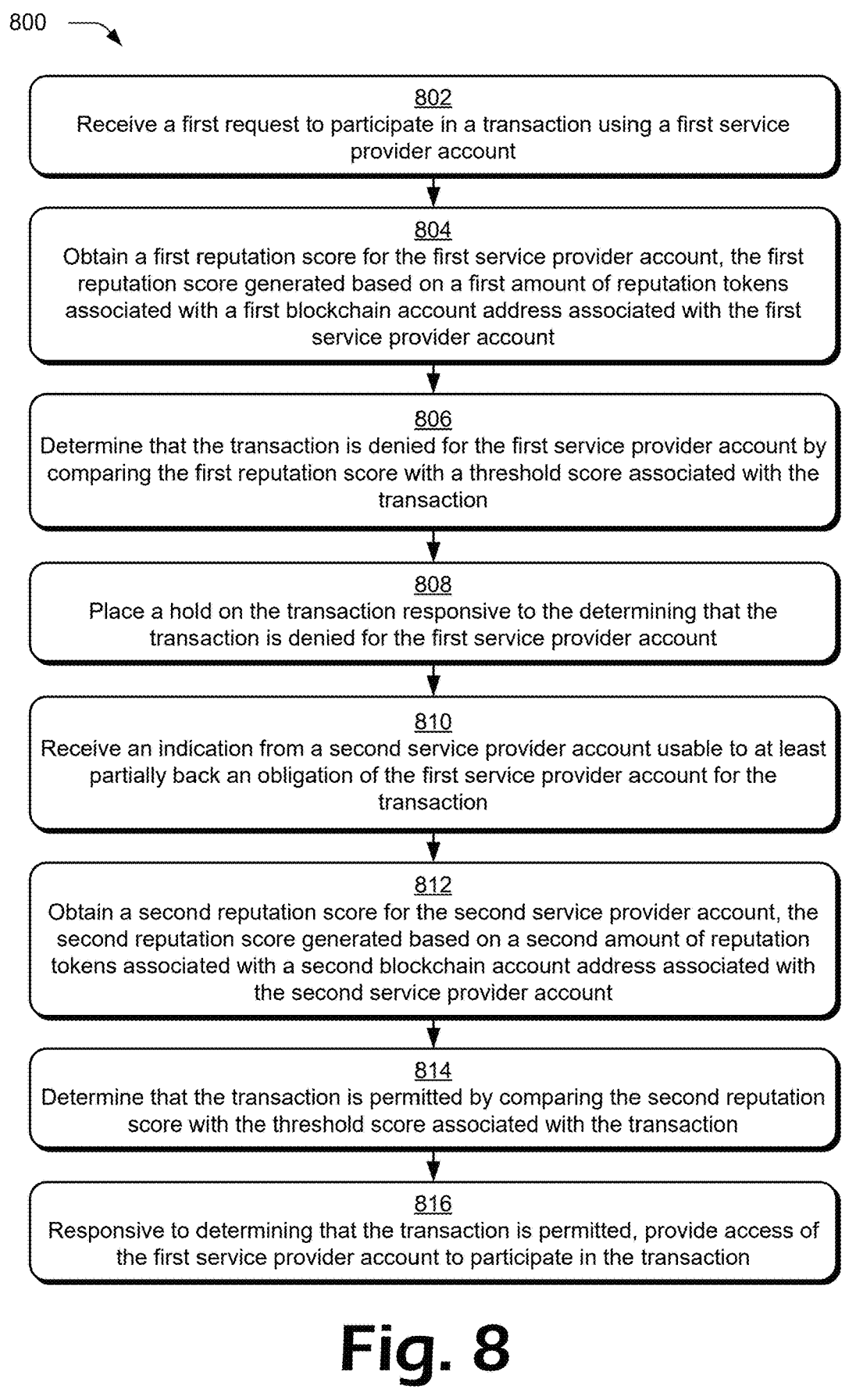

800

802
Receive a first request to participate in a transaction using a first service provider account

804
Obtain a first reputation score for the first service provider account, the first reputation score generated based on a first amount of reputation tokens associated with a first blockchain account address associated with the first service provider account

806
Determine that the transaction is denied for the first service provider account by comparing the first reputation score with a threshold score associated with the transaction

808
Place a hold on the transaction responsive to the determining that the transaction is denied for the first service provider account

810
Receive an indication from a second service provider account usable to at least partially back an obligation of the first service provider account for the transaction

812
Obtain a second reputation score for the second service provider account, the second reputation score generated based on a second amount of reputation tokens associated with a second blockchain account address associated with the second service provider account

814
Determine that the transaction is permitted by comparing the second reputation score with the threshold score associated with the transaction

816
Responsive to determining that the transaction is permitted, provide access of the first service provider account to participate in the transaction

COSIGNING USING TOKENIZED REPUTATION SCORES

RELATED APPLICATION

This application is a continuation of, and claims priority to, U.S. patent application Ser. No. 17/518,820, filed Nov. 4, 2021, and titled "Cosigning Using Tokenized Reputation Scores," the disclosure of which is hereby incorporated by reference in its entirety.

BACKGROUND

In the last decade, the Internet has expanded dramatically. More and more people around the world connect to the Internet, becoming a part of the worldwide computer network. By connecting to the Internet, users have access to vast amounts of information, which they can use to fulfill their needs via interactions with online strangers. For example, instead of going to a physical auction house, an Internet user can surf to an online auction website and place bids on an item listed by an online stranger.

However, establishing a reputation used as a basis to interact online, especially in higher stakes interactions such as economic transactions, is fundamentally different from conventional techniques used to establish a reputation, which were originally developed to address physical world challenges. Accordingly, conventional techniques for sharing an established reputation of one party for the benefit of another party also fail to address the challenges presented by online transactions.

SUMMARY

Transaction access control techniques are described to control access to transactions using cosigning based on tokenized reputation scores. These techniques are performed by computing devices by leveraging a blockchain such that cryptographic tokens establishing reputability—reputation tokens—are utilized to generate a tokenized reputation score for each service provider account of a service provider system. Throughout this discussion, "tokenized reputation score" and "reputation score" are used interchangeably. By virtue of leveraging a blockchain for these techniques, additional benefits are conferred. By way of example, participants of these tokenized reputation-based techniques are further empowered due to personal ownership and possession of the reputation tokens. In this way, people can invest in an indication of their reputability that can be freely utilized among many service provider systems because the data is owned by the user instead of by a service provider system.

Moreover, the decentralized nature of blockchain and the reputation tokens recorded on the blockchain make the tokenized reputation scores described by these techniques have increased security in comparison to conventional, centralized methods of establishing reputation. In one historical example, a centralized credit bureau, Equifax experienced a data breach that affected 147 million people. Additional benefits are discussed throughout.

The described techniques include making transactional functionality available to applicant service provider accounts based on at least a tokenized reputation score affiliated with a co-signer service provider account. This is usable to at least partially back an obligation of an applicant service provider account. In this manner, a co-signer service provider account with a qualifying tokenized reputation score is capable of cosigning for an applicant service provider account. This enables the applicant service provider account can participate in a transaction despite having an inadequate or nonexistent tokenized reputation score. In this manner, the service provider system controls access of an applicant service provider account to transactional functionality by using cosigning based on tokenized reputation scores.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 8 is a flow diagram depicting a procedure in an example implementation of cosigning techniques using tokenized reputation scores.

DETAILED DESCRIPTION

Overview

Figure 1:
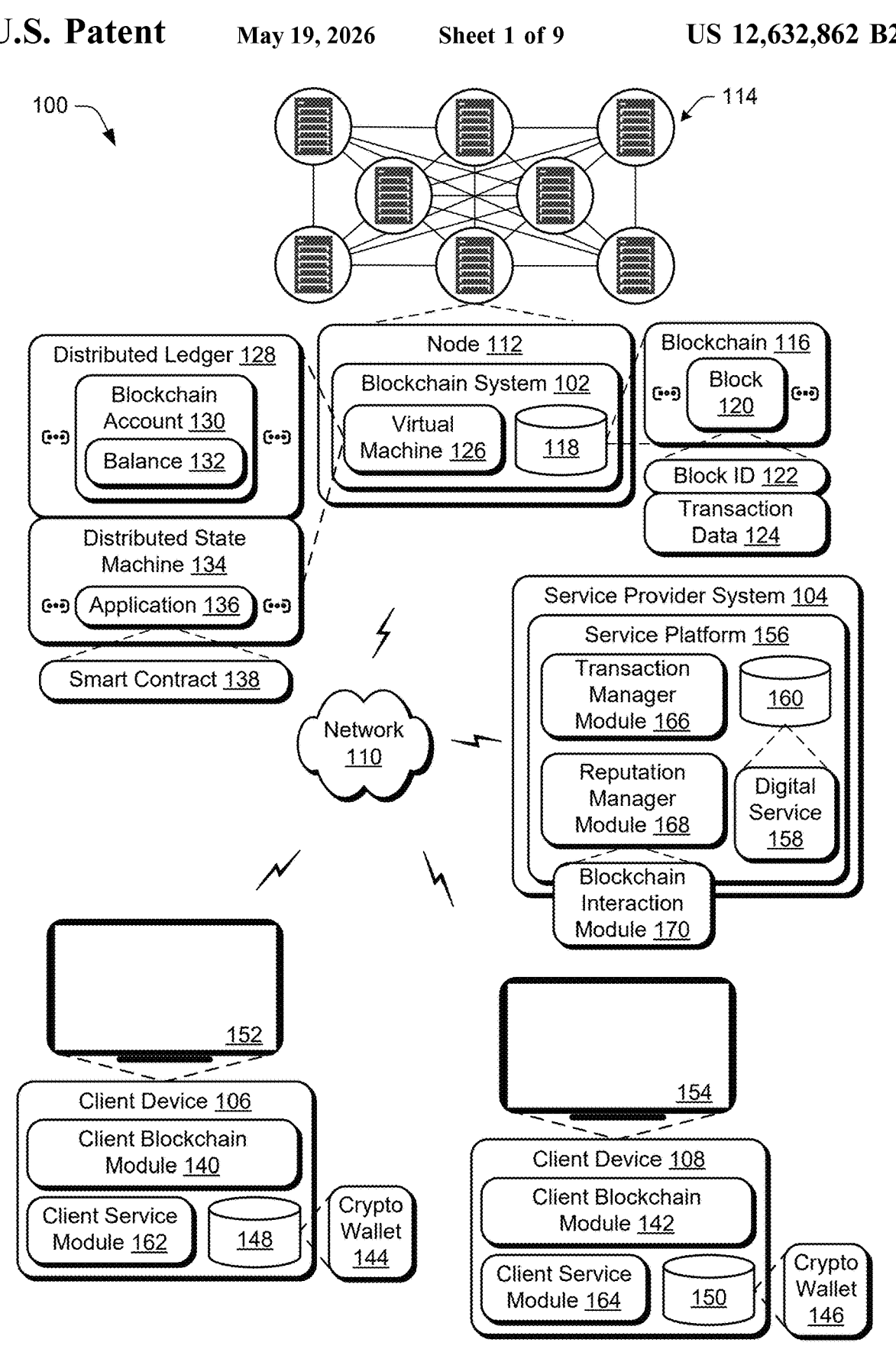
FIG. 1 is an illustration of an environment in an example blockchain implementation that is operable to employ cosigning techniques using tokenized reputation scores as described herein.

Although conventional reputation techniques have been developed over thousands of years to satisfactorily address the challenges of the physical world, conventional techniques fail to address the technical challenges presented by the online world. Because of this, adverse outcomes such as damages, frustration, and inefficiency result for users and entities transacting online.

Moreover, alternative reputation techniques that have been developed to address the challenges presented by online transactions are often limited in their usefulness. One example alternative reputation technique is credit scores. Despite the usefulness of credit scores, credit scores accrued in one country generally have no bearing in other countries, and thus provide little value in the international transactions that are ubiquitous on the Internet.

Other examples of alternative reputation techniques include centralized methods, such as feedback systems. However, the usefulness of these centralized methods is generally limited to the service provider system of which they are central to. Often, the centralized design of alternative reputation techniques does not provide a transferable or universal indication of reputation because the data is owned and controlled by the individual service provider system. As such, these centralized methods limit the opportunities of service provider accounts to leverage indications of reputation outside of an individual service provider system. Additionally, the centralized nature of this reputation data makes it vulnerable to tampering, hacking, deletion, or other adverse outcomes.

Because conventional and alternative techniques for establishing reputability do not adequately address the technical challenges of the online world and result in adverse outcomes, conventional techniques for sharing an established reputation for the benefit of another party share similar shortcomings. Therefore, it follows that conventional and alternative techniques for sharing an established reputation result in adverse outcomes such as inefficiency, inaccuracy, discrimination, vulnerability to security breaches, and lack of universal utility.

One conventional technique for sharing an established reputation is cosigning, where a third party (hereafter referred to as a "co-signer") at least partially guarantees an obligation of an applicant of a transaction. Historically, when an applicant does not individually qualify for a transaction based on their existing reputation or lack thereof, a co-signer with a qualifying reputation can co-sign for the transaction. In this way, the applicant can qualify under the shared reputation and participate in the transaction.

By way of example, a variety of assertions are made when a co-signer co-signs an apartment lease for an applicant regarding an apartment. The co-signer, for instance, provides a legal guarantee that the rent of the apartment will be paid, that any fees for damages on the apartment beyond normal wear and tear are covered, and so forth. In this example, if the applicant and the co-signer fail to pay the rent, the co-signer is responsible for the rent as if it is their apartment, and thus has an intertwined legal obligation.

Under conventional reputation sharing techniques, the sharing of a reputation is determined via inefficient, laborious techniques to ensure that at least the co-signer will fulfill the shared obligations of the transaction. Examples of this include checking references, examining whether the person has good credit, obtaining proof of employment, determining that the person has a stable income, collecting bank statements and personally identifiable information (any representation of information that permits the identity of an individual to whom the information applies to be reasonably inferred by either direct or indirect means), and so forth.

The underlying mechanism of conventional co-signing allows for resolution of some of the trust problems discussed above by instilling appropriate economic incentives for co-signers to accurately assess, manage, and fulfill transactions because of the shared risk. However, conventional reputation sharing techniques are not only inefficient, but are plagued by other issues, including discrimination, inaccuracy, data breaches, and more. Conventional techniques for reputation sharing also result in burdensome, often fruitless attempts to retrieve damages when a co-signer and participant fail to fulfill their obligations, such as debt collection, lawsuits, and so forth. Moreover, such damage retrieval techniques face increasing challenges because online transactions are conducted with strangers and entities located in jurisdictions from all around the world, where each jurisdiction has its own respective laws.

Conventional techniques for sharing reputation also lack broadly applicable or international utility. By way of example, a credit score accrued in one country that is used to share reputation has no bearing in other countries, provides little to no value in overseas financial dealings, and laws often prohibit sharing of credit information between countries. Even when laws may not prohibit sharing of credit information between countries, data protection laws vary and are complicated to navigate legally. Accordingly, conventional techniques for sharing reputation fail to address the challenges presented by online transaction and result in additional issues, including inefficiency, inaccuracy, discrimination, inadequate security, lack of broad or universal utility, and so forth.

Therefore, techniques are described, as implemented by computing devices, to control access to transactions through the use of cosigning based on tokenized reputation scores. The described techniques are performed by leveraging a blockchain such that tokenized reputation scores affiliated with service provider accounts are obtained based on amounts of cryptographic reputation tokens associated with blockchain account addresses. Each blockchain account address associated with an amount of cryptographic reputation tokens is mapped to a respective service provider account of a service provider system. Examples of service provider accounts of a service provider system include applicant service provider accounts and co-signer service provider accounts. Further, the described techniques make transactional functionality available to an applicant service provider account. This is based on at least a tokenized reputation score affiliated with a co-signer service provider account. When the tokenized reputation score, for instance, is sufficiently high when compared to a threshold score associated with a transaction requested.

In one example, a service provider system receives, from an applicant service provider account, a request to participate in a transaction. A request can be submitted by an applicant service provider account in various ways, such as in real time, via a prescheduled request, and so forth. A request can be received via a variety of computing devices, including XR devices, IoT devices, laptop devices, desktop computers, mobile devices, and so forth. A request can also be input via a variety of ways, such as via oral input, physical touch, recognized gestures, and so forth.

The service provider system obtains a first reputation score affiliated with the applicant service provider account. As discussed throughout, the first reputation score of the applicant service provider account is generated based on a first amount of reputation tokens associated with a first blockchain address associated with the applicant service provider account. A service provider system, for instance, generates a reputation score for the applicant service provider account based on a blockchain account address associated with the account. Tokenized reputation scores obtained or generated by a service provider system can be expressed in a variety of ways. Examples of this include a normalized score, a ranking, a probability, a percentage, a fraction, semantically, numerically, as digital content, or so forth.

In further examples, the generation of the reputation score is based additionally or alternatively on transactional data of the blockchain account address associated with the applicant service provider account. For instance, a longer length of a transactional history associated with a blockchain account address can result in a higher tokenized reputation score affiliated with the applicant service provider account. In contrast, a shorter length of a transactional history of a blockchain account address can result in a lower tokenized reputation score.

The generation of the reputation score is based additionally or alternatively on NFTs associated with the blockchain account address associated with the applicant service provider account. By way of example, NFTs representing reputability (e.g., a verified identity, verified or verifiable credentials, etc.) result in the generation of a higher tokenized reputation score affiliated with the applicant service provider account. For instance, an NFT representing verified credentials (e.g., from a service provider system, a government agency, a credit agency, or so forth) associated with the blockchain account address associated with the applicant service provider account can be used to generate a tokenized reputation score.

The service provider system compares the first reputation score with a threshold score associated with the transaction. Based on the comparison, the service provider system determines whether the transaction is denied or permitted for an applicant service provider account. Under a circumstance where the first reputation score is less than the threshold score, the service provider system denies the transaction for the applicant service provider account. In contrast, under a circumstance where the first reputation score is higher than or equal to a threshold score, the service provider system permits the transaction for the applicant service provider account. The threshold score can be expressed in a variety of ways, such as a normalized score, a ranking, a probability, a percentage, a fraction, semantically, numerically, or so forth. The threshold score can be obtained through generation or calculation of the threshold score via the use of machine learning. Additionally, or alternatively, the threshold score is preset by a host service provider account hosting the transaction. In this way, the host service provider account presets a level of risk with which they are comfortable. In one or more examples, a different threshold score can be obtained for different service provider accounts depending on an amount of risk predicted by the service provider system for each service provider accounts. A newly created service provider account, for instance, results in a higher threshold score, in contrast to a lower threshold score obtained for an established, long-term service provider account.

In another example, the threshold score is selected from a plurality of threshold scores, each threshold score of the plurality of threshold scores corresponding to a type of transaction. By way of example, a lower threshold score can be selected for a low-risk type of transaction, such as an instant purchase transaction. In contrast, a riskier type of transaction, such as an auction transaction, can result in the selection of a higher threshold score. Additionally, or alternatively, the threshold score is generated based on a currency amount (e.g., fiat currency, cryptocurrency, etc.) involved in a transaction. For example, a higher currency amount involved in a transaction can result in the selection of a higher threshold score than a transaction involving a lower currency amount. In one or more implementations, determining that a transaction is denied includes determining that the reputation score is lower than the threshold score. In another example, determining that a transaction is denied includes determining that the reputation score is equal to or lower than the threshold score.

Further, the service provider system places a hold on the transaction responsive to the determining that the transaction is denied for the applicant service provider account. The applicant service provider account then receives an indication that the transaction is denied or placed on hold by the service provider system. By way of example, the applicant service provider account can receive a digital message, text message, or notification of the hold. In one example, the applicant service provider account receives the indication as including functionality to arrange for a co-signer service provider account to cosign on behalf of the transaction requested.

To continue this example, the service provider system then receives an indication from a co-signer service provider account (a second service provider account) usable to at least partially back an obligation of the applicant service provider account for the transaction. In one example, the indication is submitted via user input via a user interface of a client device. An indication can be submitted by an applicant service provider account in a variety of ways, such as in real time, via a prescheduled request, and so forth.

In response, the service provider system obtains a second reputation score affiliated with the co-signer service provider account. The second reputation score of the co-signer service provider account is also generated based on an amount of reputation tokens associated with a blockchain account address associated with the respective service provider account. Specifically, the second reputation score of the co-signer service provider account is generated based on a second amount of reputation tokens associated with a second blockchain address associated with the co-signer service provider account, which is verifiable via the blockchain.

For instance, a service provider system generates a reputation score affiliated with the co-signer service provider account associated with a blockchain account address via a service platform of the service provider system. Tokenized reputation scores obtained or generated by a service provider system can be expressed in a variety of ways, including but not limited to a normalized score, a ranking, a probability, a percentage, a fraction, semantically, numerically, as digital content, or so forth. In one or more implementations, the reputation tokens are cryptographic tokens (e.g., cryptographic utility tokens, cryptographic reward tokens, fungible cryptographic tokens, or non-fungible cryptographic tokens). Generation of the reputation score can also be based, additionally, or alternatively, on transactional data of the blockchain account address associated with the co-signer service provider account. Additionally, or alternatively, the generation of the reputation score is also based on NFTs associated with the blockchain account address associated with the co-signer service provider account.

To continue this example, the service provider system determines that the transaction is permitted by comparing the second reputation score affiliated with the co-signer service provider account with the threshold score associated with the transaction. This determination includes determining that the reputation score affiliated with the co-signer service provider account is equal to or higher than the threshold score. In another example, the determination includes determining that the reputation score affiliated with the co-signer service provider account is higher than the threshold score. Additionally, or alternatively, the service provider system determines that the transaction is permitted by comparing a combined reputation score of the first reputation score and the second reputation score with the threshold score associated with the transaction.

In one example, responsive to determining that the transaction is permitted, a notification is transmitted to the co-signer service provider account specifying an amount of reputation tokens to be transferred as collateral. Here, the collateral is a prerequisite for the applicant service provider account to participate in the transaction. Further, the service provider system determines that a transfer of the amount of reputation tokens from a blockchain account address associated with the co-signer service provider account is complete. To continue this implementation, when the service provider system determines a successful completion of the transaction, the service provider system returns the collateral to the blockchain account address associated with the co-signer service provider account.

In one example, the service provider system additionally transfers a reputation reward of reputation tokens to the blockchain account address associated with the co-signer service provider account responsive to determining that the transaction was successfully completed. In this manner, co-signer service provider accounts are economically incentivized to cosign on behalf of unqualified applicant service provider accounts, and therefore assume a calculated risk associated with cosigning in exchange for potential reputation rewards that will build the existing tokenized reputation score associated with the co-signer service provider account.

Additionally, or alternatively, when the service provider system determines an unsuccessful completion of the transaction, the service provider system withholds return of the collateral. For example, if the entire collateral was provided via the blockchain account address associated with the co-signer service provider account, the collateral is not returned to the blockchain account address associated with the co-signer service provider account. By way of additional example, if the entire collateral was provided via the blockchain account addresses of both the co-signer service provider account and the applicant service provider account, the collateral is not returned to either blockchain account addresses. In this manner, the co-signer service provider account is economically incentivized to ensure that the applicant service provider account transacts in good faith. As a result, host service provider accounts have an inclination to list transactions via the service provider system account with the understanding that the tokenized reputation system is designed to economically incentivize service provider accounts to transact in good faith.

Responsive to determining that the transaction is permitted, the service provider system provides access to the applicant service provider account to participate in the transaction. Access to participate in the transaction is communicated to a client device of a service provider system via a notification (e.g., a push notification, an SMS message, a digital message, a voice message, a popup notification) or other indications of the permitting of the transaction, such as changes of the digital content displayed via the user interface of the client device of the applicant service provider account. In one example, a predetermined user activity (e.g., a transactional action, such as placing a bid on a listed item) is executed automatically responsive to the determination that the transaction is permitted. Additionally, or alternatively, the permitting of the transaction is communicated to the co-signer service provider account via a notification (e.g., a push notification, an SMS message, a digital message, a voice message, a popup notification) or other indications of the permitting of the transaction.

In this manner, the service provider system controls access of an applicant service provider account that has an insufficient tokenized reputation score to transactional functionality. The service provider system controls the access by using cosigning techniques based on a sufficient tokenized reputation score of a co-signer service provider account that is usable to at least partially back an obligation of the applicant service provider account for a transaction requested. In this way, the described cosigning techniques make transactional functionality available to the applicant service provider account despite its insufficient tokenized reputation score.

The described techniques also confer additional benefits. For example, the described techniques prevent friction at the service provider system and unpredictability for service provider accounts, and therefore encourages host service accounts to host online transactions via the service provider system. Moreover, because the owner of a blockchain account address has full possession and control over reputation tokens associated with the blockchain account address, the owner of the reputation tokens is empowered to evidence their reputation by mapping the blockchain account address to new service provider accounts of one or more service provider accounts. This enables owners of reputation tokens to potentially unlock access to transactional functionality that otherwise would not be available to service provider accounts that have not yet established reputability directly with a service provider system of a plurality of service provider systems, and to more effectively share their established reputation with unestablished service provider accounts.

Further discussion of these and other examples is included in the following sections and shown in corresponding figures. In the following discussion, an example blockchain environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a blockchain environment 100 in an example implementation that is operable to employ techniques described herein. The blockchain environment 100 includes a blockchain system 102, a service provider system 104, and a plurality of client devices (represented as client devices 106, . . . , 108) that are communicatively coupled, one to another, via a network 110. In one example, the blockchain environment 100 further includes an oracle and a distributed storage that are also communicatively coupled, one to another, via the network 110 with the blockchain system 102, the service provider system 104, and the plurality of client devices (represented as client devices 106, . . . , 108).

Computing devices that implement the blockchain environment 100 are configurable in a variety of ways. A computing device, for instance, is configurable as a desktop computer, a laptop computer, a mobile device (e.g., assuming a handheld configuration such as a tablet or mobile phone), an Internet of Things device, a wearable device, an augmented/virtual reality device, a server, and so forth. Thus, a computing device ranges from full resource devices with substantial memory and processor resources to low-resource devices with limited memory and/or processing resources. Additionally, although in instances in the following discussion reference is made to a computing device in the singular, a computing device is also representative of a plurality of different devices, such as multiple servers of a server farm utilized to perform operations "over the cloud" as further described in relation to FIG. 9.

The blockchain system 102 is implemented by a plurality of nodes 112. Nodes 112 are a runtime implemented using processing, memory, and network resources of respective computing devices 114 that operate as the infrastructure of the blockchain 116. As part of this, the nodes 112 store, communicate, process, and manage data that makes up the blockchain 116, which is illustrated as stored in a storage device 118. Nodes 112 are interconnected as illustrated in FIG. 1 to exchange data via the network 110, e.g., as a peer-to-peer network in a distributed and decentralized manner.

The blockchain 116 is formed using a plurality of blocks 120, illustrated in FIG. 1 as including respective block identifiers (IDs) 122 and transaction data 124. Transaction data 124 of the blocks 120 includes batches of validated transactions that are hashed and encoded. Each block 120 includes a cryptographic hash of a prior block 120 in the blockchain 116, thereby linking the blocks 120 to each other to form the blockchain 116. As a result, the blocks 120 cannot be altered retroactively without altering each subsequent block 120 in the blockchain 116 and in this way protects against attacks by malicious parties.

In order to generate the blocks 120 for addition to the blockchain 116, a node 112 is implemented as a "miner" to add a block of transactions to the blockchain 116. The other nodes 112 of the blockchain system 102 then check if the block of transactions is valid, and based on this, determine whether to accept or reject this data. If valid, the block of transactions is stored as transaction data 124 along with a block ID 122 for a respective block 120, e.g., is stored "at the end" or "at the top" of the blockchain 116 along with a hash of a previous block in the chain. The nodes 112 then broadcast this transaction history via the network 110 for sharing with other nodes 112. This acts to synchronize the blocks 120 of the blockchain 116 across the distributed architecture of the blockchain system 102. Other types of nodes 112 are also included as part of the blockchain system 102. In one such example, full nodes are nodes that store an entirety of the blockchain 116, e.g., locally in computer-readable storage media of a respective storage device. Other types of nodes are also employed to implement additional functionality to govern voting events, execution of protocol operations, rules enforcement, and so forth.

The blockchain system 102 implements a virtual machine 126 that is representative of a diverse range of functionality made possible by leveraging the blockchain 116. In a first such example, the virtual machine 126 implements a distributed ledger 128 of accounts 130 and associated balances 132 of those accounts 130. Distributed ledgers 128 support secure transfer of digital assets (e.g., tokens or coins of cryptocurrencies) between accounts 130 without management by a central authority through storage as part of the transaction data 124 of the blockchain 116. Through synchronized and distributed access supported by the blockchain 116 as described above, changes to balances 132 (e.g., a number of tokens) are visible to any entity with access to the blockchain 116. Techniques are also implemented to support management of the balances 132 across the accounts 130, e.g., to enforce rules that a respective account 130 does not transfer more coins than are available based on a balance 132 specified for that account 130.

In another example, the virtual machine 126 implements a distributed state machine 134 that supports application 136 execution. The distributed state machine 134 is implemented along with the transaction data 124 within the blocks 120 of the blockchain 116 such that the blocks describe accounts and balances as described above for the distributed ledger 128. The transaction data 124 also supports a machine state, which can change from block to block of the blockchain 116. In one example, the application 136 is executable as part of a "Turing-complete" decentralized virtual machine that is distributed across the nodes 112 of the blockchain system 102. As Turning-complete, the application 136 is computationally universal to perform computing device operations, e.g., logic or computing functions. Thus, the application 136 is executable by a processing system of a computing device as software that is storable in a computer-readable storage media of the nodes 112 to perform a variety of operations.

An example of an application 136 that is executable as part of the distributed state machine 134 is a smart contract 138. A smart contract 138 is executable automatically and without user intervention (or with partial human interaction as inputs when desired) by the nodes 112 of the distributed state machine 134. Execution of the smart contract 138 includes obtaining data from a specified data source (e.g., devices, APIs, and so forth that are accessible via the network 110), and based on this data, initiating one or more operations based on conditions described in the smart contract 138. In one example, the smart contract 138 is a type of account 130 that includes a balance 132 and initiates transactions based on conditions specified by the smart contract 138, e.g., to support automated escrow and other functionalities. A variety of other examples are also contemplated that support implementation of any executable operation by a computing device using software.

Cryptocurrencies allow individuals to make payments using their digital currency. Individuals can use tokens, however, for other purposes. By way of example, individuals can use tokens for trading, to hold and store value, and so forth. Some examples of types of tokens include utility tokens, governance tokens, security tokens, and non-fungible tokens (NFTs). Utility tokens, for example, provide an owner of the token with access to a blockchain-based product or service.

In an additional example of a token, the smart contracts 138 implement non-fungible tokens (NFTs). NFTs include digital assets that are provably unique and as such cannot be duplicated or divided. As such, NFTs are not exchanged as having a same value as coins in cryptocurrency, but rather are digital assets having identifying information recorded as part of the smart contract 138. This identifying information is immutably recorded on that token's blockchain 116 and thus ownership of the token is also recorded and tracked. A variety of information is storable as part of the digital content represented by the NFT, examples of which include digital images, digital media, digital content, executable instructions of an application 136 as described above, secure file links, in-game tokens, digital artwork, and so forth. Other examples of tokens are also contemplated that are fungible and as such are interchangeable with each other.

The client devices 106, 108 include respective client blockchain modules 140, 142 that are representative of functionality of the client devices 106, 108 to interact with the blockchain system 102. An example of this functionality includes management of respective crypto wallets 144, 146, e.g., in local storage devices 148, 150. The crypto wallets 144, 146 store public and private cryptographic keys in this example that are used to support interaction with the blockchain system 102, and more particularly respective accounts 130 of the blockchain system 102, using respective user interfaces 152, 154.

The public key supports transactions to an address of the account 130 derived from the public key, which are stored as part of the blockchain 116 to memorialize the transaction as part of transaction data 124. In one example, an address of an account 130 is generated by first generating a private key, e.g., using a randomization technique. The corresponding public key is derived from the private key and the address of the account 130 is then derived from the public key, e.g., as an entirety of the public key or as a shortened version of the public key. The private key is used to "unlock" transactions that are "locked" by the public key and gain access to the account 130, e.g., access to coins, tokens or other information maintained as part of the transaction.

In one example, a transaction is initiated by the client device 106 with client device 108. Data of the transaction is encrypted using a public key. The transaction is then signed by client device 108 using the private key which indicates that the transaction has not been modified, e.g., by encrypting the data being sent in the transaction using the private key. The transaction is then verifiable as authentic by using the public key included with the data. The nodes 112 use the accompanying public key to automatically verify authenticity that the transaction is signed using the private key. Transactions that fail authentication are rejected by the nodes 112. Authentic transactions are used as part of transaction data 124 in minting blocks 120 by the nodes 112 that are added to the blockchain 116, e.g., as part of the distributed ledger 128. In this way, the virtual machine 126 of the blockchain system 102 supports a variety of functionality through use of the distributed ledger 128, distributed state machine 134, and/or other blockchain and cryptographic functionality.

The blockchain environment 100 also includes a service provider system 104 implementing a service platform 156 of digital services 158, illustrated as maintained in a storage device 160 and are executable via a processing system. Digital services 158 involve electronic delivery of data and implementation of data functionality by computing devices to support a range of computing device operations. Digital services 158, for instance, include creation, management, and dissemination of digital content via the network 110, e.g., webpages, applications, digital images, digital audio, digital video, and so forth. The digital services 158 are also implemented to control access to and transfer of physical goods and services through corresponding digital content, e.g., sales, product listings, advertisements, etc. Digital services 158 further pertain to operation of computational resources (e.g., processing, memory, and network resources) of computing devices that support the access to and management of the digital content by the system.

Functionality of the client devices 106, 108 to access the digital services 158 of the service provider system 104 is represented by respective client service modules 162, 164. The client service modules 162, 164, are configurable as browser, network-enabled applications, third-party plugins, and so on to access the digital services 158 via the network 110.

The service provider system 104 also includes a transaction manager module 166 and a reputation manager module 168. The transaction manager module 166 is configured to control access of service provide accounts to transactions based on tokenized reputation scores or reputation tokens. For instance, if a determination is made that a transaction is denied for a service provider account based on an insufficient tokenized reputation score, the transaction manager module 166 places the transaction on hold for the service provider account. In another instance, a determination is made that a transaction is approved for a first service provider account based on a sufficient tokenized reputation score formed via a combination of reputation scores of the first service account and a second service account. The second service provider account at least partially backs an obligation of the first service provider account for a transaction. In response, the transaction manager module 166 can permit access to the transaction for the first service provider account.

The reputation manager module 168 is also configured to, via a blockchain interaction module 170, manage the transfer of reputation tokens through use of an application 136 generated by the service provider system 104 and executed by the distributed state machine 134. The service platform 156, for instance, includes a digital service 158 configured to support transactions of items, e.g., physical items or digital content, using service provider accounts. By way of example, transferring reputation tokens is initiated by the service platform 156, responsive to a transaction, based on a reputation reward calculated based on data describing the transaction. By way of additional example, transferring a collateral of reputation tokens is initiated by the service platform 156 responsive to determining a successful completion of a transaction by a service provider account. The blockchain interaction manager module 170, for instance, initiates, via the blockchain system 102, a transfer ownership of reputation tokens to a blockchain account 130 as part of the blockchain 116, ownership of which is associated with a blockchain account 130 of a participant of the transaction. In this way, execution of the application 136 provides an ability of the service provider system 104 to communicate further with the client devices 106 and 108. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Cosigning Based on Tokenized Reputation Scores

Figure 2:
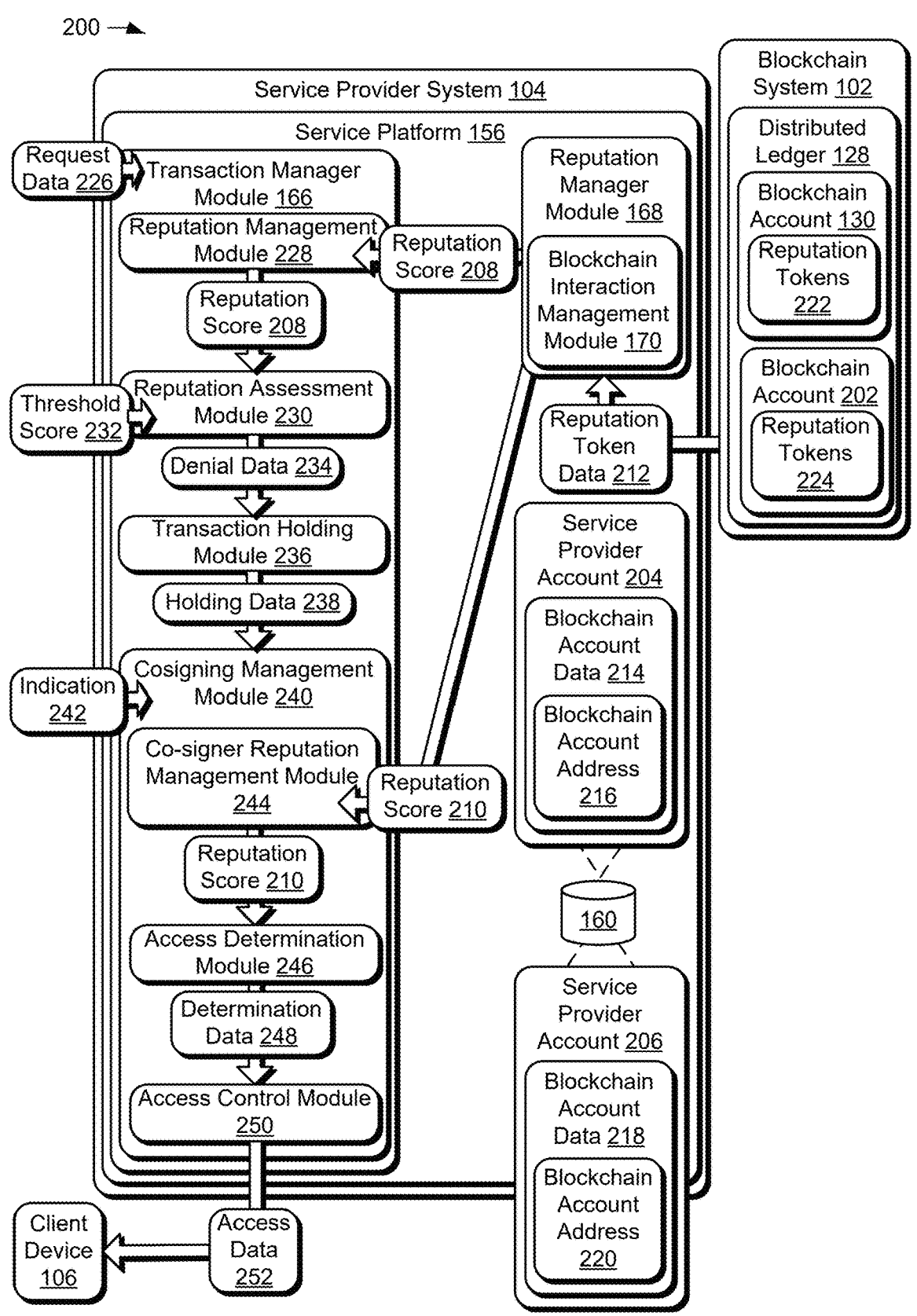
FIG. 2 depicts a system in an example system showing operation of a service platform of a service provider system of FIG. 1 in greater detail as controlling access of a first service provider account to a transaction based on a reputation score of a second service provider account usable to at least partially back an obligation of the first service provider account for the transaction.

FIG. 2 depicts a system in an example system 200 showing operation of a service platform 156 of a service provider system 104 of FIG. 1 in greater detail as controlling access of a first service provider account 204 to a transaction based on a reputation score 210 of a second service provider account 206 usable to at least partially back an obligation of the first service provider account 204 for the transaction.

To begin in the illustrated example of FIG. 2, a service provider system 104 includes a service platform 156 having a reputation manager module 168, a transaction manager module 166, and a storage device 160. The service platform 156 supports user interaction via client devices (e.g., client devices 106 and 108), such as transactions, by implementing digital services 158. A variety of transactions are contemplated, including but not limited to auction transactions, nonfungible token transactions, digital twin transactions, swapping transactions, instant purchase transactions, rental transactions, borrowing transactions, and so forth. In one or more implementations, the digital services 158 are executable to initiate transfer of ownership and/or possession of an item to or from the client devices 106 or 108, blockchain accounts 130 or 202, and so forth.

The reputation manager module 168 is configured to manage processes relevant to tokenized reputation of service provider accounts 204 and 206 of the service provider system 104. Examples of these processes include generation of reputation scores 208 and 210 affiliated respectively with service provider accounts 204 and 206, obtaining reputation token data 212 from a blockchain system 102, and so forth. The reputation manager module 168 includes a blockchain interaction management module 170, which the reputation manager module 168 uses to interact with blockchain system 102. For instance, the blockchain interaction management module 170 retrieves the reputation token data 212 for blockchain accounts 130 and 202, which are used to generate reputation scores 208 and 210 for service provider accounts 204 and 206 respectively.

The transaction manager module 166 is configured to manage processes relevant to transactional functionality for service provider accounts 204 and 206 of the service provider system 104, such as access control using cosigning based on reputation scores 208 and 210 of service provider accounts 204 and 206.

The storage device 160 includes the service provider account 204 having blockchain account data 214 having a blockchain account address 216 associated with the service provider account 204. The storage device 160 also includes the service provider account 206 having blockchain account data 218 having a blockchain account address 220 associated with the service provider account 206. The storage device 160 can also include other types of data, such as a service provider account identifiers, blockchain account identifiers associated with the service provider accounts 204 and 206, transactional data, and so forth.

In system 200, the reputation manager module 168 generates the reputation score 208 affiliated with the service provider account 204 associated with the blockchain account address 216. In one example, the reputation score 208 is generated based at least in part on an amount of reputation tokens 222 associated with the blockchain account address 216 of blockchain account 130. As discussed throughout, reputation tokens 222 or 224 are cryptographic tokens of a blockchain system 102 that establish a reputation of a user having a private key of a blockchain account 130 or 202. In one example, the reputation tokens 222 or 224 are fungible cryptographic utility tokens.

Reputation tokens 222 or 224 are usable to establish a reputation with or without a service provider system's interpretation of the reputation tokens 222 or 224, for instance, as a reputation score 208 or 210. The use of reputation tokens 222 or 224 provides users with personal ownership over data relevant to their reputation. This grants users with a universal reputation that is resistant to censorship, deletion, and tampering by third parties. Unlike conventional indications of reputability, such as review or feedback data owned by a service provider system 104, reputation tokens 222 or 224 are not owned by the service provider system 104. This is because the described techniques are non-custodial, rather than custodial. In short, the service provider system 104 does not own an amount of reputation tokens 222 or 224 associated with a blockchain account address 216 or 220. Instead, a user with a private key associated with a blockchain account address 216 or 220 associated with the amount of reputation tokens 222 or 224 has ownership of the amount of reputation tokens 222 or 224. In this way, a user that owns an amount of reputation tokens 222 or 224 is empowered to evidence their universal reputation outside of the service provider system 104. For instance, among a plurality of service provider systems 104, among a plurality of governments, or so forth.

Moreover, reputation tokens 222 or 224 associated with a blockchain account address 216 or 220 are resistant to tampering or deletion by parties without an associated private key because the reputation tokens 222 or 224 are recorded via a decentralized system instead of a centralized system, and are additionally secured via cryptography. In contrast, data owned by a centralized system (e.g., a centralized service provider system 104) is vulnerable to tampering, deletion, breaches, and other adverse outcomes. In this way, reputation tokens 222 or 224 are used as the central mechanism of establishing a reputation, instead of simply generating reputation data that is stored in a centralized manner. This is because unlike conventionally centralized reputation data, reputation tokens 222 or 224 of a blockchain system 102 are difficult to tamper with, censor, corrupt, or delete. Therefore, due to the vulnerabilities inherent to centralized forms of data, the described techniques do not simply generate a reputation score 208 or 210. For the forgoing reasons, the described techniques leverage reputation tokens 222 or 224, which are reinterpreted by a service provider system 104 as a reputation score 208 or 210.

Reputation tokens 222 or 224 can be obtained by users in various ways. In one example, a service provider system 104 receives data describing user activity associated with a service provider account 204 or 206 of the service provider system 104. The service provider system 104 determines whether the user activity is eligible for a reputation reward, and if so, the service provider system 104 invokes a smart contract 138 of a blockchain system 102 to initiate a calculation of an amount of reputation tokens 222 or 224 to be minted and/or transferred as a reputation reward. In one example, the smart contract 138 orchestrates a computation of the reputation reward with an oracle that is configured to execute an algorithm to compute the reputation reward based on the user activity of the service provider account 204 or 206.

Oracles provide trustless (or near-trustless) ways of obtaining off-chain information, such as the distributed storage data of a distributed storage, for the use of smart contracts 138 of a blockchain system 102. Oracles are also used to directly relay data securely to decentralized application frontends. In short, oracles are a mechanism for bridging the gap between off-chain systems and on-chain smart contracts 138. Oracles provide a few key functions, including the ability to collect data from an off-chain source, transfer the data on-chain with a signed message, and make the data available by putting it in a smart contract's 138 storage. Once the data is available in smart contract's 138 storage, it can be accessed by other smart contracts 138 via message calls that invoke a retrieve function of the oracle's smart contract 138. The data can also be accessed by nodes 112 of a blockchain system 102 or network-enabled clients directly by inspecting an oracle's storage. In this example, the oracle provides a reputation reward of reputation tokens 222 or 224 that is computed to be transferred to a service provider account 204 or 206 based on user activity data. The oracle is configured to execute an algorithm configured to compute the reputation reward based on the user activity data.

The user activity of the service provider account 204 or 206 can be obtained from an off-chain distributed storage by the oracle. In one example, the distributed storage includes distributed storage data. The distributed storage data includes data received from one or more service provider systems 104, such as the user activity data or the request data 226. In one example, the distributed storage is a distributed public storage. In this manner, the distributed storage data of the distributed storage is transparent to participants of the system 200, such as one or more service provider systems 104, at least regarding blockchain account identifiers or blockchain account addresses 216 or 220. It is advantageous to store data via a distributed storage because the full replication of blocks 120 of a blockchain 116 across the nodes 112 of the blockchain system 102 has limited storage capacity and limited scalability in comparison to using a distributed storage. Storing large amounts of data within a transaction via a blockchain system 102 is challenged by the limited size of the transaction and blocks 120 of the blockchain 116. For example, Ethereum has a block 120 gas limit to determine the number, computational complexity, and data size of the transactions included in a block 120. Data cannot take advantage of the immutability or integrity guarantees without being stored on the blockchain 116. The use of an off-chain distributed storage addresses these issues while ensuring that any given service provider system 104 does not have direct control over the distributed storage, and therefore cannot abuse the distributed storage. Notably, "off-chain" does not necessarily mean not on a blockchain 116.

In one example, the user activity data is normalized data. Data normalization reduces a number of anomalies that complicate data analysis. Anomalies can occur from deleting data, inserting more information, or updating existing information. Data normalization enables increased efficiency and use of the user activity data. Normalized data also consumes less space, increases technical performance, and removes redundancies. In one example, the user activity data is passed per a uniform standard that is agreed upon amongst one or more participating service provider systems 104. Regardless, the user activity data from the service provider system 104 can be stored as part of the distributed storage data by the distributed storage.

To continue this example, responsive to computation of the reputation reward, the smart contract 138 mints and/or transfers the amount of reputation tokens 222 or 224 as a reputation reward to a blockchain account address 216 or 220 associated with the service provider account 204 or 206. In this manner, the smart contracts 138 of the blockchain system 102, especially if in concert with an oracle and a distributed storage, are used by the service provider system 104 to calculate a reputation reward of reputation tokens 222 or 224 with consistency and transparency. The described techniques also result in a reduction of on-chain computation or storage needs, which can thus scale independently. The described techniques ensure the integrity of the minting and transfer of reputation tokens 222 or 224, which is importantly designed to protect against abuse from a service provider system 104. The described techniques also provide consistency to the computation of reputation tokens 222 or 224, because different service provider systems 104 can have different computation techniques for calculating an amount of reputation tokens 222 or 224 to transfer as a reputation reward. Moreover, the use of oracles, a distributed storage, and smart contracts 138 provides transparency to all participants, including service provider systems 104 and service provider accounts 204 or 206. The described techniques also improve the cost efficiency involved with 'gas' affiliated with on-chain transactions, while addressing the limitations of on-chain storage limitations.

It is to be appreciated that the described calculation, minting, and transferring techniques of reputation tokens 222 or 224 do not preclude an independent reputation token management layer of a service provider system 104. In another example, a service provider system 104 receives data describing user activity associated with a service provider account 204 or 206 of the service provider system 104. The service provider system 104 determines whether the user activity is eligible for a reputation reward, and if so, the service provider system 104 calculates the reputation reward based on the data describing the user activity. Further, the service provider system 104 initiates a transfer of reputation tokens 222 or 224 to a blockchain account address 216 or 220 associated with the service provider account 204 or 206 based on the reputation reward. The transfer of the reputation tokens 222 or 224 can be from an exchange, a wallet provider, a contract address, and external account address, or so forth.

In system 200, the reputation manager module 168 also generates the reputation score 210 affiliated with the service provider account 206 associated with the blockchain account address 220. In this example, the reputation score 210 is generated based at least in part on an amount of reputation tokens 224 associated with the blockchain account address 220 of blockchain account 202. The reputation scores 208 and 210 can be based at least in part on transactional data associated with their respective blockchain account addresses 216 or 220 of respective blockchain accounts 130 or 202. The amount of reputation tokens 222 or 224 associated with the respective blockchain account addresses 216 or 220 of the respective blockchain accounts 130 or 202 is determined by the service provider system 104 in various ways. In one example, the service provider system 104 determines the amount of reputation tokens 222 or 224 associated with a blockchain account 130 or 202 via reputation token data 212 received from the blockchain system 102. The blockchain interaction management module 170 of the reputation manager module 168 receives the reputation token data 212 from the blockchain system 102.

In the illustrated example, the transaction manager module 166 of the service provider system 104 receives request data 226 to perform a transaction. By way of example, the request data 226 can be received from various computing devices, such as the client devices 106 or 108.

The service provider system 104 is configured to, via a reputation management module 228, obtain the reputation score 208 for service provider account 204. As already discussed throughout, the reputation score 208 for service provider account 204 is generated based on an amount of reputation tokens 222 associated with the blockchain account address 216 associated with the service provider account 204.

As shown in FIG. 2, the reputation assessment module 230 of the service platform 156 receives the reputation score 208. The reputation assessment module 230 is also configured to obtain a threshold score 232. The threshold score 232 is associated with the transaction. Threshold scores can be in a numerical format, such as from '0' to '850'. By way of example, a threshold score for a luxury item transaction can be '800', whereas a threshold score for an instant purchase transaction can have a threshold score of '0'.

In at least some instances, the threshold score 232 is selected from a plurality of threshold scores, each threshold score 232 of the plurality of threshold scores corresponding to a type of transaction. Some examples of different types of transactions include luxury item transactions, auction transactions, fiat currency transactions, crypto transactions, instant purchase transactions, and so forth. By way of example, a luxury item type of transaction can correspond with a higher threshold score than a than a threshold score corresponding to a non-luxury item type of transaction.

The reputation assessment module 230 also includes functionality to obtain or calculate the threshold score 232 based on an amount (e.g., an amount of fiat currency, an amount of cryptocurrency, etc.) involved in a transaction. It is to be appreciated that the threshold score 232 can be obtained, calculated, or generated based on any number of factors, such as a threshold severity, a threshold risk, or so forth. The threshold score 232 can be predetermined or preselected by a host service provider account that is hosting the requested transaction. In this way, host service provider accounts customize the degree of risk, with which they are comfortable while hosting listings online via the service provider system 104 or the service platform 156.

The reputation assessment module 230 of the service provider system 104 determines whether the transaction is denied for the applicant service provider account 204 by comparing the reputation score 208 of the applicant service provider account 204 with the threshold score 232 associated with the transaction. For example, the reputation assessment module 230 determines that the transaction is denied for the applicant service provider account 204 when the reputation score 208 is below the threshold score 232. As part of a determination that the transaction is denied, the reputation assessment module 230 generates denial data 234, which is sent to the transaction holding module 236 of the transaction manager module 166.

Responsive to receiving the denial data 234 including the determination, the transaction holding module 236 places a hold on the transaction. In system 200, the transaction holding module 236 places a hold on the transaction via holding data 238 (e.g., preventing further communication) that is sent to the cosigning management module 240 of the transaction manager module 166. In one example implementation, the transaction is an online auction transaction. In such an online auction example, when an applicant service provider account 204 does have a reputation score 208 that meets the threshold score 232 of the online auction, the applicant service provider account 204 is barred from transactional functionality of the online auction, such as placing an offer or a bid. For example, if a threshold score 232 of '750' is associated with the online auction, and the applicant service provider account 204 has a reputation score below '750', the reputation assessment module 230 passes denial data 234 to the transaction holding module 236. In turn, the transaction holding module 236 places a hold on the transaction for the applicant service provider account 204 via the holding data 238. This hold can be indicated via a notification providing notice of the hold on the transaction. This hold can also be indicated via other types of information, such as instructions or selectable elements to initiate cosigning via a co-signer service provider account 206. In the online auction example, the service provider system 104 can provide until the end of the bidding period of the online auction to enable the applicant service provider account 204 to use a co-signer service provider account 206 to obtain access to the transactional functionality of the online auction.

To continue this example, the cosigning management module 240 receives an indication 242 from a service provider account 206 that is usable to at least partially back an obligation of the service provider account 204 as a co-signer. For ease of understanding and clarity, the service provider account 206 is referred to interchangeably throughout as "co-signer service provider account 206", "service provider account 206", or "second service provider account 206".

Upon receiving the indication 242, the co-signer reputation management module 244 obtains a reputation score 210 for the co-signer service provider account 206. As discussed throughout, the reputation score 210 for the co-signer service provider account 206 is generated based on an amount of reputation tokens 224 associated with the blockchain account address 220 associated with the service provider account 206.

By comparing the reputation score 210 of the co-signer service provider account 206 with the threshold score 232 of the transaction, the access determination module 246 determines whether the transaction is permitted. By way of example, the access determination module 246 determines that the transaction is permitted when the reputation score 210 of the co-signer service provider account 206 is equal to or higher than the threshold score 232. In another example, the access determination module 246 determines that the transaction is denied when the reputation score 210 of the co-signer service provider account 206 is lower than the threshold score 232. In one example, the access determination module 246 determines that the transaction is permitted based on comparing a combined reputation score of the reputation score 208 of the service provider account 204 and the reputation score 210 of the co-signer service provider account 206 with the threshold score 232 associated with the transaction. In such an example, when the combined reputation score is equal to or higher than the threshold score 232, the access determination module 246 determines that the transaction is permitted. In this illustrated example, when the access determination module 246 determines that the transaction is permitted, determination data 248 is passed from the access determination module 246 to the access control module 250. The access determination module 246 includes additional functionality, as further discussed below.

By way of example, the access determination module 246 transmits to the co-signer service provider account 206 a notification specifying an amount of reputation tokens to be transferred as collateral for the applicant service provider account 204 to participate in the transaction. To continue this example, the access determination module 246 detects or determines when a transfer of the amount of reputation tokens as the collateral from the blockchain account address 220 associated with the co-signer service provider account 206 is successfully completed. In one example, the amount of reputation tokens transferred as the collateral can be locked up in a smart contract 138 that is executed via the blockchain system 102. Further, when the access determination module 246 detects or determines a successful completion of the transaction, the access determination module 246 responsively returns the collateral to the blockchain account address 220 associated with the co-signer service provider account 206.

To continue the earlier example, the collateral of the amount of reputation tokens that were transferred to and locked up via the smart contract 138 can be automatically released from the smart contract 138 and returned responsive to detecting the successful completion of the transaction. By leveraging a smart contract 138 of the blockchain system 102, the reputation tokens are conferred greater security because of the many nodes that comprise the blockchain system 102. This is in contrast to data that is maintained by a centralized system, such as the service provider system 104; data that is maintained by a centralized system is vulnerable to internal actors of the service provider system 104 (e.g., tampering) and other types of security breaches. In addition to a more secured facilitation of reputation tokens, leveraging blockchain technology as described confers further technical benefits, such as ensuring a more transparent performance the transaction, such as transparent movement of the collateral.

The access determination module 246 has additional functionality to transfer a reputation reward of reputation tokens to the blockchain account address 220 associated with the co-signer service provider account 206 responsive to a determination that a transaction is successfully completed. In this manner, co-signer service provider accounts 206 are economically incentivized to cosign on behalf of unqualified applicant service provider accounts 204, and therefore assume a calculated risk associated with cosigning in exchange for potential reputation rewards that will build the existing tokenized reputation score 210 associated with the co-signer service provider account 206.

Additionally, or alternatively, when the access determination module 246 determines an unsuccessful completion of the transaction, the access determination module 246 responsively withholds return of at least a portion of the collateral to the blockchain account address 220 associated with the co-signer service provider account 206. In this manner, the co-signer service provider account 206 is economically incentivized to ensure (e.g., socially) that the applicant service provider account 204 transacts in good faith. As a result, host service provider accounts are more inclined to list transactions via the service provider system 104 with the understanding that the tokenized reputation mechanisms of the service provider system 104 are designed to economically incentivize the plurality of service provider accounts of the service provider system to transact in good faith. As already discussed above, technical benefits are also conferred by leveraging a blockchain system 102. By way of example, by using a smart contract 138 of the blockchain system 102 to lock up the transferred reputation tokens of the collateral, the reputation tokens are conferred greater security then that of a centralized system because of the many nodes that comprise the blockchain system 102. In addition to superior security, leveraging the blockchain system 102 as ensures a more transparent performance the transaction, such as the withholding of the return of the collateral.

Responsive to receiving the determination data 248, the access control module 250 of the service provider system 104 provides access to the applicant service provider account 204 to participate in the transaction. The access control module 250 of the service provider system 104 is indicative of functionality to manage access control of the plurality of service provider accounts of the service provider system 104. In this example illustration, the access control module 250 passes access data 252 to the client device 106 of service provider account 204 to permit the transaction. The access data 252 includes a variety of information, examples of which includes a displayable indication (e.g., a notification) that the transaction is permitted. The displayable indication, for instance, can overlay an item page for the transaction. Therefore, in this manner, the service provider system 104 controls access of the applicant service provider account 204 to transactional functionality using cosigning based on tokenized reputation scores 208 and/or 210 of the service provider accounts 204 and 206. The co-signer service provider account 206 is usable to at least partially back an obligation of the applicant service provider account 204 for a transaction.

Figure 3:
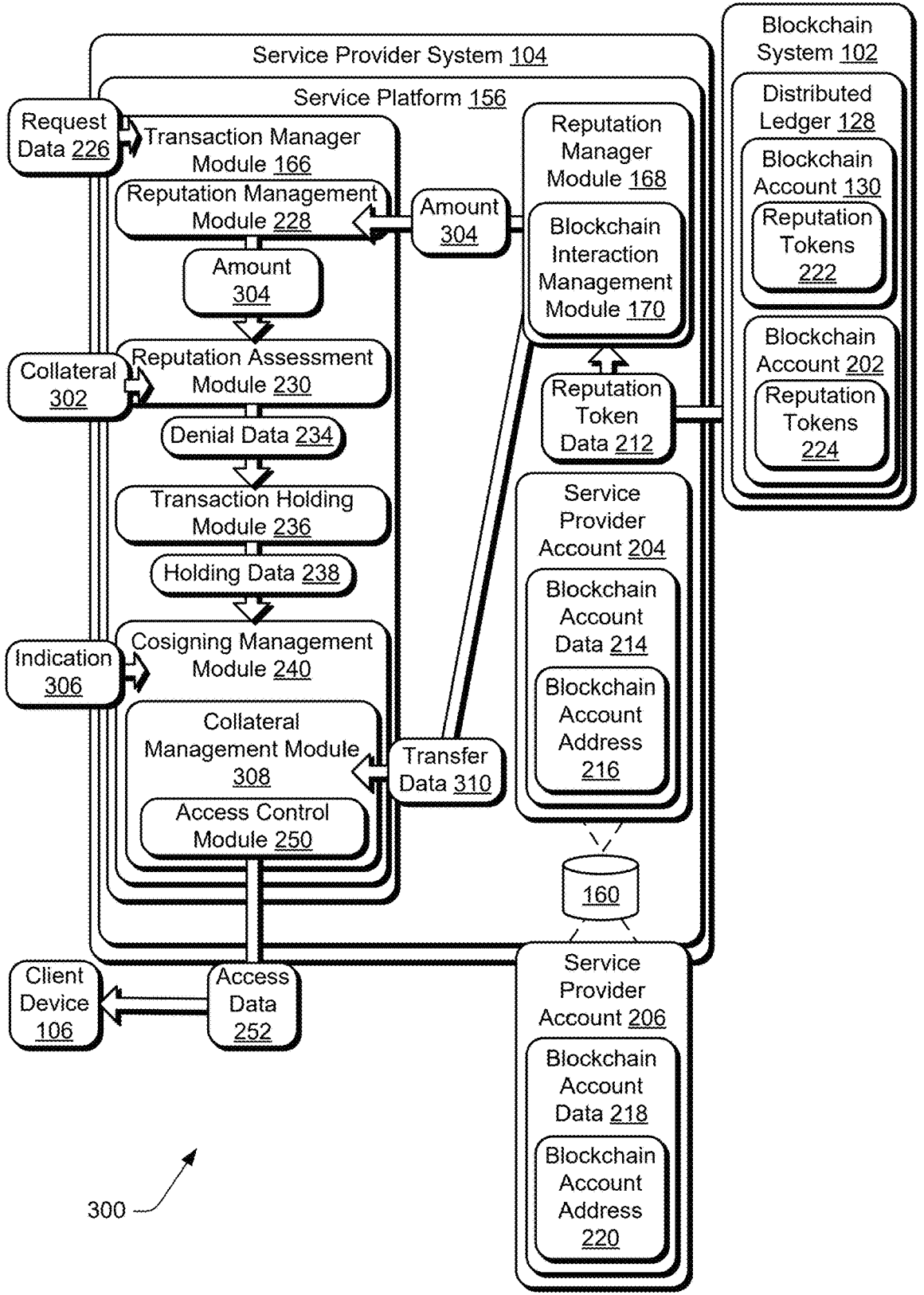
FIG. 3 depicts a system in an example implementation showing operation of a service platform of a service provider system of FIG. 1 in greater detail as controlling access of a first service provider account to a transaction based on a second service provider account usable to at least partially back, via reputation tokens, a collateral of the first service provider account for the transaction.

FIG. 3 depicts a system 300 in an example implementation showing operation of a service platform 156 of a service provider system 104 of FIG. 1 in greater detail. In this example, the service platform 156 controls access of an applicant service provider account 204 to a transaction based on a co-signer service provider account 206. The service provider system 104 uses the co-signer service provider account 206 to at least partially back a collateral 302 specifying an amount of reputation tokens for the applicant service provider account 204 for the transaction.

To begin in the illustrated example of FIG. 3, a service provider system 104 includes a service platform 156 having a reputation manager module 168, a transaction manager module 166, and a storage device 160. The service platform 156 is configured to support user activity of client devices (e.g., client devices 106 and 108), such as transactions, by implementing digital services 158. The digital services 158 are executable to initiate transfer of ownership and/or possession of an item to or from the client devices 106 or 108, blockchain accounts 130 or 202, and so forth. The reputation manager module 168 is configured to manage processes relevant to tokenized reputation of service provider accounts 204 and 206 of the service provider system 104. Examples of these processes include generation of reputation scores 208 and 210 affiliated respectively with service provider accounts 204 and 206, obtaining reputation token data 212 from a blockchain system 102, and so forth. The reputation manager module 168 also includes a blockchain interaction management module 170, which the reputation manager module 168 uses to interact with blockchain system 102. For instance, the blockchain interaction management module 170 retrieves the reputation token data 212 for blockchain accounts 130 and 202. The reputation manager module 168 uses the amounts of reputation tokens 222 or 224 indicated by the reputation token data 212 to generate reputation scores 208 and 210 for the service provider accounts 204 and 206.

The transaction manager module 166 is configured to manage processes relevant to transactional functionality for service provider accounts 204 and 206 of the service provider system 104. Examples of transactional functionality include access control using cosigning based on transferring an amount of reputation tokens specified by a collateral 302 of a transaction by at least one of service provider accounts 204 and 206.

The storage device 160 includes the service provider account 204. The service provider account 204 includes blockchain account data 214 and a blockchain account address 216. The service provider account 206 includes blockchain account data 218 having a blockchain account address 220 associated with the service provider account 206. The storage device 160 can also include other types of data, such as a service provider account identifiers, blockchain account identifiers, transactional data, and so forth.

The amount of reputation tokens 222 or 224 associated with the respective blockchain account addresses 216 or 220 of the respective blockchain accounts 130 or 202 is determinable by the service provider system 104 in variety of ways. Examples of this include receipt of reputation token data 212 from the blockchain system 102 by the blockchain interaction management module 170 of the reputation manager module 168.

To continue this example, the service provider system 104 receives request data 226 to perform a transaction. Specifically in this example, the transaction manager module 166 of the service platform 156 receives the request data 226. The request data 226 can be received from various types of computing devices, including client devices 106 or 108.

The service provider system 104 is configured to, via a reputation management module 228 of the transaction manager module 166, obtain an amount 304 of reputation tokens 222 associated with the blockchain account address 216 of the service provider account 204. This amount 304 is received by the reputation assessment module 230 of the transaction manager module 166 of the service platform 156. Further, the reputation assessment module 230 of the transaction is configured to determine that the transaction is denied for the service provider account 204 based on a comparison of the amount 304 of reputation tokens 222 associated with the blockchain account address 216 of the applicant service provider account 204 with collateral 302 associated with the transaction. The collateral 302 specifies an amount of reputation tokens to be transferred for the applicant service provider account 204 to participate in the transaction.

The reputation assessment module 230 is further configured to receive, obtain, calculate, or generate a collateral 302 associated with the transaction. In one example, the collateral 302 is selected from a plurality of collaterals, each collateral 302 of the plurality of collaterals corresponding to a type of transaction. Example types of transactions include fiat currency transactions, cryptocurrency transactions, luxury item transactions, auction transactions, NFT transactions, NFT digital twin transactions, instant purchase transactions, rental transactions, service transactions, or so forth. The reputation assessment module 230 also includes functionality to obtain, generate, or calculate the collateral 302 based on an amount (e.g., an amount of fiat currency, an amount of cryptocurrency, etc.) involved in a transaction. It is to be appreciated that the collateral 302 can be obtained, calculated, or generated based on any number of factors, such as a threshold severity, a threshold risk, or so forth. The collateral 302 can be predetermined or preselected by a host service provider account that is hosting the requested transaction. In this way, host service provider accounts are enabled to customize the degree of risk that they are comfortable with while hosting listings online via the service provider system 104 or the service platform 156.

The reputation assessment module 230 of the service provider system 104 is configured to determine that the transaction is denied for the service provider account 204 by comparing the amount 304 of reputation tokens 222 associated with the blockchain account address 216 associated with the service provider account 204 with the collateral 302 associated with the transaction. As part of the determination that the transaction is denied, the reputation assessment module 230 generates denial data 234, which is passed to the transaction holding module 236 of the transaction manager module 166.

Responsive to receipt of the denial data 234, the transaction holding module 236 places a hold on the transaction. The transaction holding module 236 places a hold on the transaction via holding data 238 that is sent to the cosigning management module 240 of the transaction manager module 166. In one example, the transaction holding module 236 places a hold on an online auction transaction, where the applicant service provider account 204 is denied to ability to participate in the online auction transaction, such as to place an offer. This is different from a placement of a hold on a conventional auction, where a hold is placed on a credit or a debit card of a participant. Instead of tying up a participant's fiat currency, the transaction holding module 236 simply removes the ability of the applicant service provider account 204 to participate in the online auction transaction.

To continue this illustrated example, the cosigning management module 240 is configured to receive an indication 306 from a co-signer service provider account 206. The indication 306 is usable to at least partially back the collateral 302 of the applicant service provider account 204 as a co-signer.

Further, a collateral management module 308 of the cosigning management module 240 is configured to determine or detect a transfer of the amount of reputation tokens specified by the collateral 302 from at least a blockchain account address 220 associated with the co-signer service provider account 206. In this example illustration, the collateral management module 308 determines the transfer of the amount of reputation tokens via receipt of transfer data 310 from the reputation manager module 168. The amount of reputation tokens specified as the collateral 302 can be received from at least one of the blockchain account address 216 associated with the co-signer service provider account 206 or the blockchain account address 220 associated with the service provider account 204. In short, the collateral 302 can be satisfied by reputation tokens 222 or 224 associated with the blockchain account addresses 216 or 220 associated with the service provider accounts 204 or 206.

Responsive to determination, the access control module 250 is configured to provide access to the applicant service provider account 204 to participate in the transaction. In this example illustration, the control module 250 provides access to the applicant service provider account 204 by passing access data 252 to the client device 106 of the applicant service provider account 204. The access control module 250 of the service provider system 104 is indicative of functionality to manage access control of service provider accounts 204 and 206.

The access data 252 is configured to include various types of information, an example of which includes a displayable indication that the transaction is permitted, such as a displayable indication that overlays an item page of the transaction. Therefore, in this manner, the service provider system 104 controls access of the applicant service provider account 204 to transactional functionality by using cosigning; the cosigning is based on the reputation tokens 222 and 224 of the service provider accounts 204 and 206, where the co-signer service provider account 206 is used to at least partially back the collateral 302 of the service provider account 204 for a transaction.

The collateral management module 308 of the service provider system 104 also includes additional functionality, as further discussed below. In one example, the collateral management module 308 detects or determines a successful completion of the transaction. When the collateral management module 308 determines a successful completion of the transaction, the collateral management module 308 responsively returns the collateral 302 to the blockchain account addresses 216 or 220 that originally transferred the collateral 302.

The collateral management module 308 has additional functionality to transfer a reputation reward of reputation tokens to the blockchain account address 220 associated with the co-signer service provider account 206 responsive to a determination that the transaction is successfully completed. In one example, the reputation reward of reputation tokens is automatically transferred via the execution of a smart contract 138 of the blockchain system 102. Because the blockchain system 102 is leveraged, the transfer of the reputation reward is performed in a transparent and secure manner, with less friction or costs (e.g., the conventional costs of middlemen entities) on the service provider system 104. Additionally, co-signer service provider accounts 206 are economically incentivized to co-sign on behalf of unqualified applicant service provider accounts 204, and therefore assume a calculated risk associated with cosigning in exchange for potential reputation rewards.

Additionally, or alternatively, when the collateral management module 308 determines an unsuccessful completion of the transaction, the collateral management module 308 responsively withholds return of the collateral 302 to the blockchain account addresses 216 or 220 that originally transferred the collateral 302. In this manner, the co-signer service provider account 206 is economically incentivized to ensure (e.g., socially) the applicant service provider account 204 transacts in good faith. In this way, host service provider accounts are more inclined to list transactions via the service provider system 104 with the understanding that the tokenized reputation mechanisms of the service provider system 104 are designed to economically incentivize transacting in good faith.

Figure 4:
FIG. 4 depicts an example implementation of a user interface of a client device depicting a request to participate in a transaction using an applicant service provider account.

FIG. 4 depicts an example implementation 400 of a user interface 152 of a client device 106 depicting a request to participate in a transaction using a first service provider account 204.

The illustrated example implementation 400 depicts a client device 106 as displaying an example of the service platform 156 via a user interface 152 of the client device 106, e.g., a touchscreen. The illustrated example implementation 400 includes from FIG. 2 an example of a reputation score 208 and an example of a threshold score 232. Here, the user interface 152 includes a listing 404 for an authentic, luxury watch that is listed for an online auction of a service provider system 104. The listing 404 includes a listing fee 406 of 25 Ether or $75,000 USD, and a representation 402 of a service provider account 204 of the service provider system 104. The listing 404 also includes a reputation score 208 of the service provider account 204, a threshold score 232 for the transaction of the listing 404, and a selectable element 408 for selection via user input 410 to submit a request (e.g., request data 226) to participate in the transaction. It is to be appreciated that the service platform 156 is configurable to include other selectable elements that are selectable to submit request data 226 for a transaction.

Specifically, in this illustrated example implementation 400, the luxury watch transaction of listing 404 has a threshold score 232 of "750", and the service provider account 204, as represented by the representation 402 ("@pendingpatent", an online handle representing the service provider account 204), has a reputation score 208 of "10". In summary, the reputation score 208 ("10") of the service provider account 204 is below the threshold score 232 ("750") of the listing 404. In the illustrated example implementation 400, the selectable element 408 receives the user input 410, thus submitting request data 226 for the transaction. However, because the reputation score 208 of the service provider account 204 ("10") is lower than the threshold score 232 ("750") for the online auction transaction, the online auction transaction of illustrated example implementation 400 is denied, as depicted in the following discussion of FIG. 5.

It is to be appreciated that the above noted example is merely one example of how a service provider account 204 affiliated with a tokenized reputation score 208 can request to participate in a transaction via a user interface 152 of a client device 106. In this context, consider the following discussion of FIG. 5.

Figure 5:
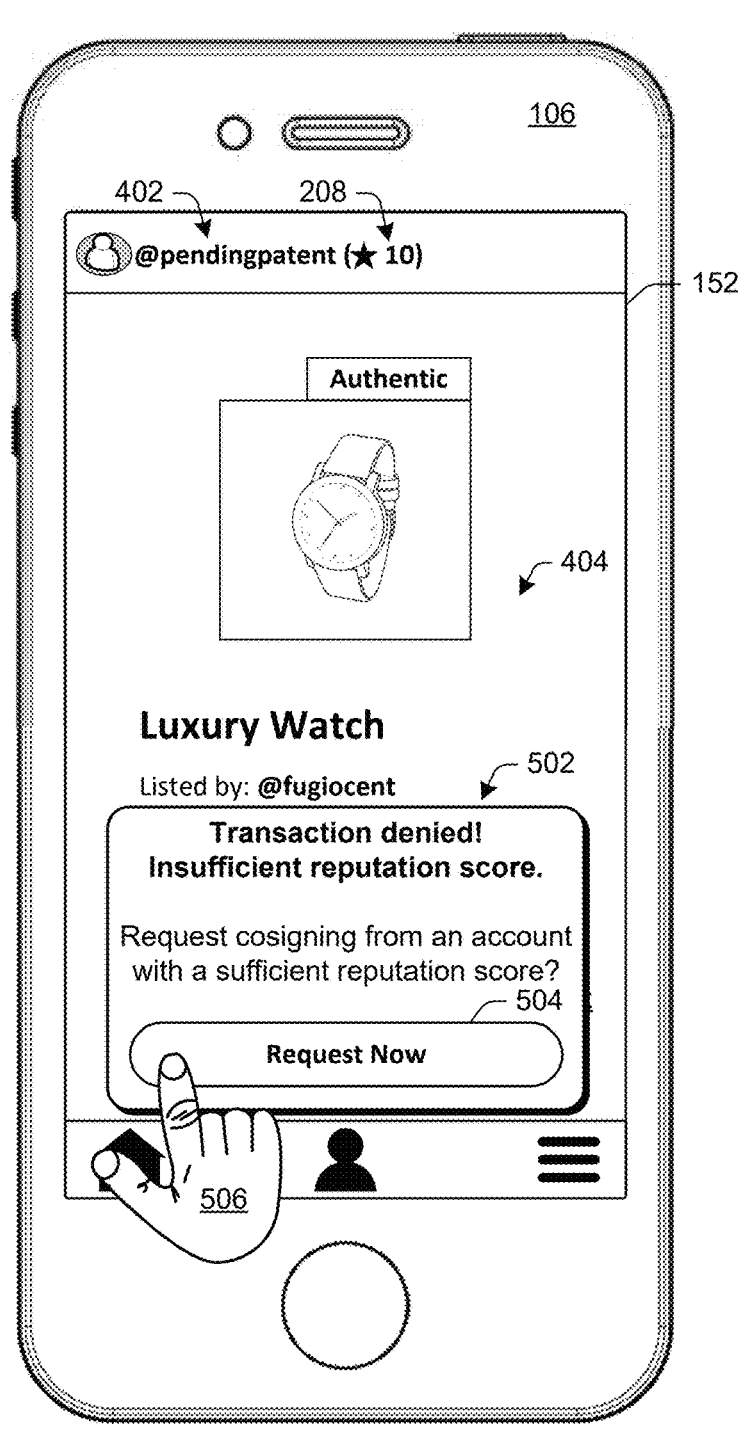
FIG. 5 depicts an example implementation of a user interface of a client device depicting a transaction that is placed on hold for an applicant service provider account by comparing a tokenized reputation score of the applicant service provider account with a threshold score associated with the transaction.

FIG. 5 depicts an example implementation 500 of a user interface 152 of a client device 106 depicting a transaction that is placed on hold for a first service provider account 204 by comparing a first tokenized reputation score 208 of the first service provider account 204 with a threshold score 232 associated with the transaction.

The illustrated example implementation 500 includes from FIG. 1 an example of the client device 106 displaying an example of the service platform 156 via a user interface 152 of the client device 106, e.g., a touchscreen. The illustrated example implementation 500 includes from FIG. 2 an example of a reputation score 208 affiliated with a service provider account 204 and an example of a threshold score 232 of a transaction. The illustrated example implementation 500 includes from FIG. 4 an example representation 402 of a service provider account 204 and an example listing 404 for a transaction.

Here, the user interface 152 includes a listing 404 for an authentic, luxury watch for an online auction transaction of a service provider system 104, a representation 402 of a service provider account 204 of the service provider system 104, a reputation score 208 of the service provider account 204, a notification 502 indicating that the request to participate in the online auction transaction has been denied due to an insufficient reputation score, and a selectable element 504. The selectable element 504 can be selected via user input 506 to submit a request to a different service provider account 206 to cosign on behalf of the service provider account 204 to be provided access to the transaction. It is to be appreciated that the service platform 156 can include other selectable elements that are selectable to submit a request to a different service provider account 206 to co-sign for the transaction. It is to also be appreciated that user input 506 can be provided in a variety of ways, including via touch, audio, recognized gestures, and so forth.

Specifically, in FIG. 5, the luxury watch transaction of listing 404, as already discussed in FIG. 4, has a threshold score 232 of "750", and the service provider account 204, as represented by the representation 402, has a reputation score 208 of "10". In summary, the reputation score 208 of the service provider account 204 is below the threshold score 232 of the listing 404. Accordingly, the transaction of illustrated example implementation 500 is placed on hold responsive to the request data 226 provided in FIG. 4, as indicated by the depicted notification 502.

Here, the service provider account 204 is provided until the end of the bidding period of the online auction transaction to qualify for participation in the online auction. The service provider account 204 can qualify based on an updated reputation score 208 that is equal to or higher than the threshold score 232. The service provider account 204 can also qualify by using a co-signer service provider account 206 that has a sufficiently high enough reputation score 210 to at least partially guarantee the service provider account's 204 obligations for the online auction transaction.

It is to be appreciated that the above noted example implementation 500 is merely one example of how a transaction is placed on hold for a first service provider account 204 by comparing a first tokenized reputation score 208 of the first service provider account 204 with a threshold score 232 associated with the transaction. In this context, consider the following discussion of FIG. 6.

Figure 6:
FIG. 6 depicts an example implementation of a user interface of a client device depicting submitting an indication from a co-signer service provider account usable to at least partially back an obligation of an applicant service provider account for a transaction, wherein a tokenized reputation score of the co-signer service provider account is above a threshold score associated with the transaction.

FIG. 6 depicts an example implementation 600 of a user interface 154 of a client device 106 depicting submitting an indication 242 from a co-signer service provider account 206 usable to at least partially back an obligation of a service provider account 204 for a transaction. The tokenized reputation score 210 of the co-signer service provider account 206 in this example is above a threshold score 232 associated with the transaction.

The illustrated example implementation 600 includes from FIG. 1 an example of the client device 108 displaying an example of the service platform 156 via a user interface 154 of the client device 108, e.g., a touchscreen. The illustrated example implementation 600 includes from FIG. 2 an example of a reputation score 210 ("800") affiliated with a co-signer service provider account 206 and an example of a threshold score 232 ("750") of a transaction. The illustrated example implementation 600 includes from FIG. 4 an example listing 404 for a transaction including a listing fee 406. Here, the user interface 154 further includes a selectable element 602 to submit an indication 242 to at least partially back an obligation of a service provider account 204 for a transaction and a representation 604 of the co-signer service provider account 206 ("@co-signer", an online handle representing the co-signer service provider account 206).

A co-signer service provider account with a reputation score 210 of "800" is selected, via user input 606, to cosign for a service provider account 204 (@pendingpatent). In response, the service provider account 204 is provided access to participate in a transaction for the luxury watch listing 404.

It is to be appreciated that the service platform 156 can include other selectable elements that are selectable to submit an indication 242 to co-sign for the transaction. The user input 606 can also be provided in a variety of ways, including via touch, audio, recognized gestures, and so forth.

Specifically, in this illustrated example implementation 600, the luxury watch transaction of listing 404, as already discussed in FIG. 4, has a threshold score 232 of "750", and the service provider account 204 seeking a co-signer for the transaction has an insufficient reputation score 208 of "10". However, as depicted in example implementation 600, the co-signer service provider account 206 has a tokenized reputation score 210 of "800". Because the tokenized reputation score 210 of the co-signer service provider account 206 ("800") is higher than the threshold score 232 ("750") associated with the transaction, the co-signer service provider account 206 is qualified to cosign on behalf of the service provider account 204.

The above noted example 600 is merely one example of how a co-signer service provider account 206 can submit an indication 242 to cosign for a transaction on behalf of the service provider account 204, such that the co-signer service provider account 206 is usable to at least partially back an obligation of a service provider account 204 for the transaction. In this context, consider the following discussion of FIG. 7.

Figure 7:
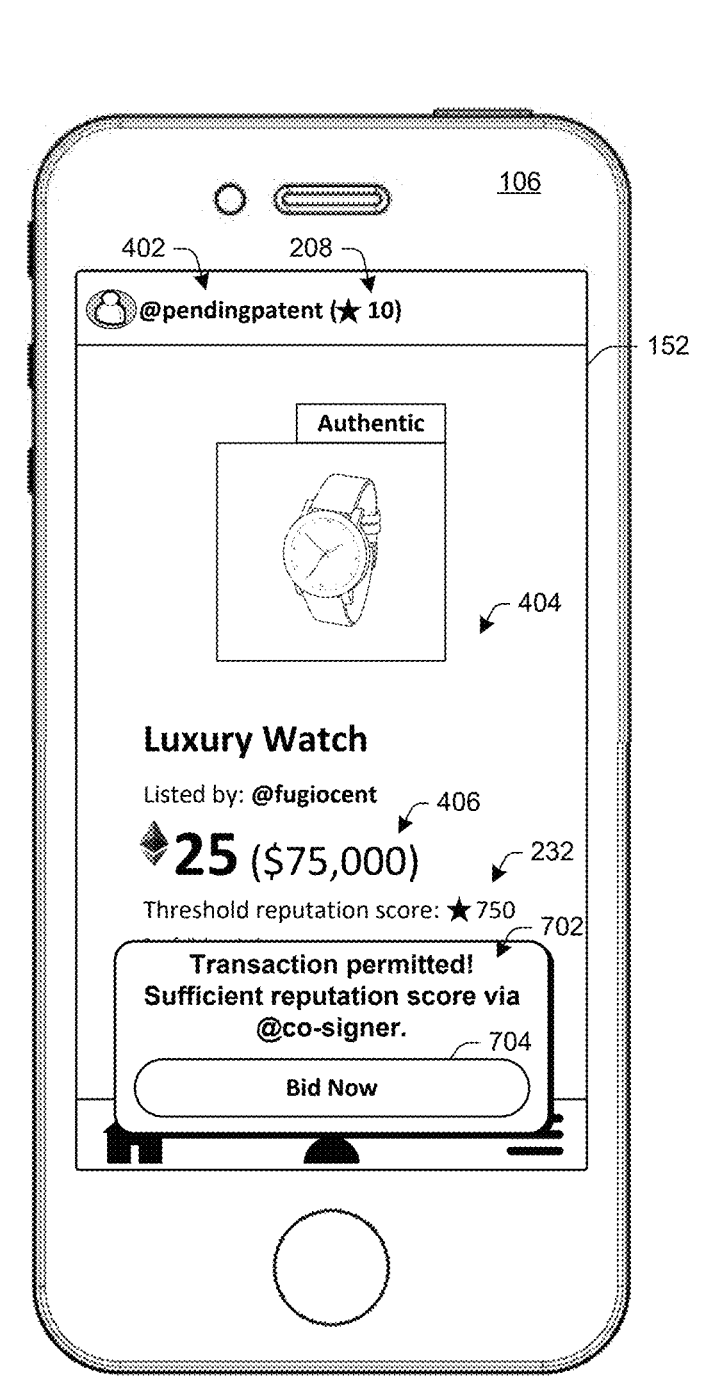
FIG. 7 depicts an example implementation of a user interface of a client device depicting providing access to an applicant service provider account to participate in a transaction based on a co-signer service provider account—having a reputation score above a threshold score associated with the transaction—providing an indication to at least partially back an obligation of the applicant service provider account for the transaction.

FIG. 7 depicts an example implementation 700 of a user interface 152 of a client device 106 depicting providing access to a service provider account 204 to participate in an online auction transaction. Access is provided based on a co-signer service provider account 206—having a reputation score 210 above a threshold score 232 associated with the transaction—providing an indication 242 to at least partially back an obligation of the service provider account 204 for the transaction.

The implementation 700 of FIG. 7 includes from FIG. 1 an example of the client device 106 displaying an example of the service platform 156 via a user interface 152 of the client device 106, e.g., a touchscreen. The illustrated example implementation 700 includes from FIG. 2 an example of a reputation score 208 ("10") affiliated with an applicant service provider account 204 and an example of a threshold score 232 ("750") of an online auction transaction. The illustrated example implementation 700 includes from FIG. 4 an example representation 402 of an applicant service provider account 204 and an example listing 404 for a online auction transaction. Here, the user interface 152 includes a listing 404 for an authentic, luxury watch for an online auction transaction of a service provider system 104, a representation 402 of an applicant service provider account 204 of the service provider system 104 ("@pendingpatent", an online handle representing the applicant service provider account 204), and a reputation score 208 (10) of the applicant service provider account 204. The user interface 152 also includes a notification 702 indicating that the transaction has been permitted due to a sufficient reputation score of at least the reputation score 210 of the co-signer service provider account 206 of the example implementation 600 of FIG. 6, and a selectable element 704 that can be selected via user input to participate in the transaction requested by the applicant service provider account 204 in the example implementation 400 of FIG. 4. It is to be appreciated that the service platform 156 can include other selectable elements that are selectable by the applicant service provider account 204 to participate in the transaction. It is to also be appreciated that user input can be provided in a variety of ways, including via touch, audio, recognized gestures, and so forth.

As already discussed in FIG. 6, the co-signer service provider account 206 had a sufficiently high reputation score 210 in comparison to the threshold score 232 associated with the transaction. Accordingly, as depicted in this example illustration 700, based on the cosigning performed by the co-signer service provider account 206 as depicted in example illustration 600 of FIG. 6, the transaction for the listing 404 is permitted. Accordingly, access is provided to the service provider account 204 to participate in the transaction for the luxury watch, such as bidding on the luxury watch.

It is to be appreciated that the above noted example 700 is merely one example of how access is provided to an applicant service provider account 204 to participate in a transaction based on a co-signer service provider account 206—having a reputation score 210 above a threshold score 232 associated with the transaction—providing an indication 242 to at least partially back an obligation of the applicant service provider account 204 for the transaction.

FIG. 8 is a flow diagram depicting a procedure 800 in an example implementation of cosigning using tokenized reputation scores 208 and 210.

To begin, the service provider system 104 receives a first request to participate in a transaction using a first service provider account (block 802). This is performable in a variety of ways, such as via user input received via a user interface 152 of a client device 106 of a service provider account 202 of the service provider system. By way of example, a user input is one of various ways to request to participate in a transaction, such as to submit a bid for an online auction of a service provider system 104. As discussed throughout, various types of transactions are contemplated, such as auction transactions. The request can be received from a variety of computing devices, including but not limited to client devices 106 or 108. In one example, the service provider system 104 receives the request via user input via a selectable element.

Responsive to the request, the service provider system 104 obtains a first reputation score 208 for the first service provider account 204. The first reputation score 208 is generated based on a first amount of reputation tokens 222 associated with a first blockchain account address 216 associated with the first service provider account 204 (block 804). Although this procedure 800 depicts a flowchart where the service provider system 104 generates a reputation score 208 based at least in part on an amount of reputation tokens 222 associated with the blockchain account address 216 of blockchain account 130, the generation of the reputation score 208 is performable in a variety of ways. In one example, the service provider system 104 generates a reputation score 208 based on transactional data associated with the blockchain account address 216.

Notably, the amount of reputation tokens 222 can be determined by the service provider system 104 in various ways. For instance, the blockchain interaction management module 170 is configured to receive reputation token data 212 from the blockchain system 102. By way of example, the blockchain interaction management module 170 automatically receives reputation token data 212 from the blockchain system 102 (e.g., via a smart contract 138 or an application 136) at predefined intervals by the blockchain interaction module 170, responsive to a predefined condition being met.

Alternatively, or additionally, the service provider system 104 generates a reputation score 208 affiliated with a service provider account 204 associated with a blockchain account identifier (e.g., an Ethereum Name Service domain name, a Coinbase Wallet username, and so forth) instead of a blockchain account address 216, where the blockchain account identifier is associated with the blockchain account address 216. By way of example, the blockchain account identifier can be mapped to a blockchain account address 216 that is associated with a service provider account 204. In one example, the reputation score 208 is generated by a different service provider system than the service provider system 104.

The service provider system 104 obtains the reputation score 208 affiliated with the first service provider account 204. In one example, the service provider system 104 obtains the reputation score 208 from a storage device of the service provider system 104. In another example, the service provider system 104 obtains from a different service provider system.

Further, the service provider system 104 determines that the transaction is denied for the first service provider account 204 by comparing the first reputation score 208 with a threshold score 232 associated with the transaction (block 806). As previously described, determining that a transaction is denied can include determining that the reputation score 208 is equal to or lower than the threshold score 232. The service provider system 104 can receive the threshold score 232 from a variety of types of sources, including a client device 106 or 108. The threshold score 232 is also capable of changing in real time (e.g., based on a real-time assessment of risk, a predicted severity of an adverse outcome, and so forth), or being static. In one example, the service provider system 104 selects the threshold score 232 from a plurality of threshold scores, each threshold score 232 of the plurality of threshold scores corresponding to a type of transaction, such as a luxury transaction. Additionally, or alternatively, the threshold score 232 is calculated based on an amount (e.g., an amount of fiat currency, an amount of cryptocurrency, etc.) involved in a transaction. A transaction corresponding to a value or an amount of 1 Bitcoin, for instance, may have a higher threshold score 232 than a transaction corresponding to a value or an amount of 50,000,000 satoshis (half of a Bitcoin).

Responsive to a determination that the transaction is denied for the first service provider account 204, the service provider system 104 places a hold on the transaction (block 808). In one example, the client device 106 of the service provider account 204 receives an indication that the transaction is denied when the service provider system 104 places a hold on the transaction. The indication, for instance, is configurable as a digital message, a text message, a notification, or so forth. In another example, the user interface of a client device 106 of a service provider account 204 displays a notification denying an attempted transaction based on a determination to deny the transaction based on the insufficient reputation score 208 of the service provider account 204. In this manner, access by a service provider account 204 to transactional functionality is controlled by the service provider system 104 based on a tokenized reputation score 208 of the service provider account 204. However, the service provider account 204 can still obtain access to transactional functionality via the use of a different service provider account 206 with a reputation score 210 that is sufficiently high enough in comparison to the threshold score 232 associated with the transaction requested.

To continue this example, the service provider system 104 receives an indication 242 from a second service provider account 206 usable to at least partially back an obligation of the first service provider account 204 for the transaction (block 810). In this manner, the co-signer service provider account 206, acts as a co-signer for the transaction requested by the service provider account 204. In one example, the co-signer service provider account 206 submits the indication via user input via a user interface of a client device 108. The indication can take a variety of forms, examples of which include a digital signature provided, a confirmation to enter into an agreement to at least partially back an obligation of the first service provider account 204 for the transaction, and so forth.

Further, the service provider system 104 obtains a second reputation score 210 for the second service provider account 206. The second reputation score 210 is generated based on a second amount of reputation tokens 224 associated with a second blockchain account address 220 associated with the second service provider account 206 (block 812).

The generation of the reputation score 210 is performable in a variety of ways, such as through generating the reputation score 210 additionally or alternatively based on transactional data associated with the blockchain account address 220. Notably, the amount of reputation tokens 224 can be determined by the service provider system 104 in various ways. For instance, the blockchain interaction management module 170 is configured to receive reputation token data 212 from the blockchain system 102. By way of example, the blockchain interaction management module 170 automatically receives reputation token data 212 from the blockchain system 102 (e.g., via a smart contract 138 or an application 136) at predefined intervals by the blockchain interaction management module 170, responsive to a predefined condition being met.

Alternatively, or additionally, the service provider system 104 can generate a reputation score 210 affiliated with a service provider account 206 associated with a blockchain account identifier (e.g., an Ethereum Name Service domain name, a Coinbase Wallet username, and so forth) instead of a blockchain account address 220, where the blockchain account identifier is associated with the blockchain account address 220. By way of example, the blockchain account identifier can be mapped to a blockchain account address 220 that is associated with a service provider account 204. Alternatively, the reputation score 210 can be generated by a different service provider system than the service provider system 104.

The service provider system 104 obtains the reputation score 210 affiliated with the second service provider account 206. As with the reputation score 208 of the first service provider account 204, the obtaining of the reputation score 210 can be performed in a variety of ways, including receiving the reputation score 210 from a storage device 160 of the service provider system 104, from a different service provider system, and so forth.

To continue this example, the service provider system 104 determines that the transaction is permitted by comparing the second reputation score 210 with the threshold score 232 associated with the transaction (block 814). As discussed throughout, the service provider system 104 determines that the transaction is permitted when the second reputation score 210 is equal to or greater than the threshold score 232 associated with the transaction. Additionally, or alternatively, the service provider system 104 determines that the transaction is permitted when a combined reputation score of the first reputation score 208 affiliated with the service provider account 204 and the second reputation score 210 affiliated with the co-signer service provider account 206 is equal to or greater than the threshold score 232 associated with the transaction.

Further, responsive to a determination that the transaction is permitted, the service provider system 104 provides access of the first service provider account 204 to participate in the transaction (block 816). In one example, a client device 106 of a service provider account 204 receives an indication that participation in the transaction is permitted or allowed. In another example, the user interface of a client device 106 of a service provider account 204 displays new or added digital content enabling transactional functionality that was previously inaccessible by the service provider account 204. One such example is transactional functionality to submit a bid for a transaction.

In this manner, access by a service provider account 204 to transactional functionality is controlled by the service provider system 104 by using cosigning based on tokenized reputation scores 208 and 210 of service provider accounts 204 and 206.

Example System and Device

Figure 9:
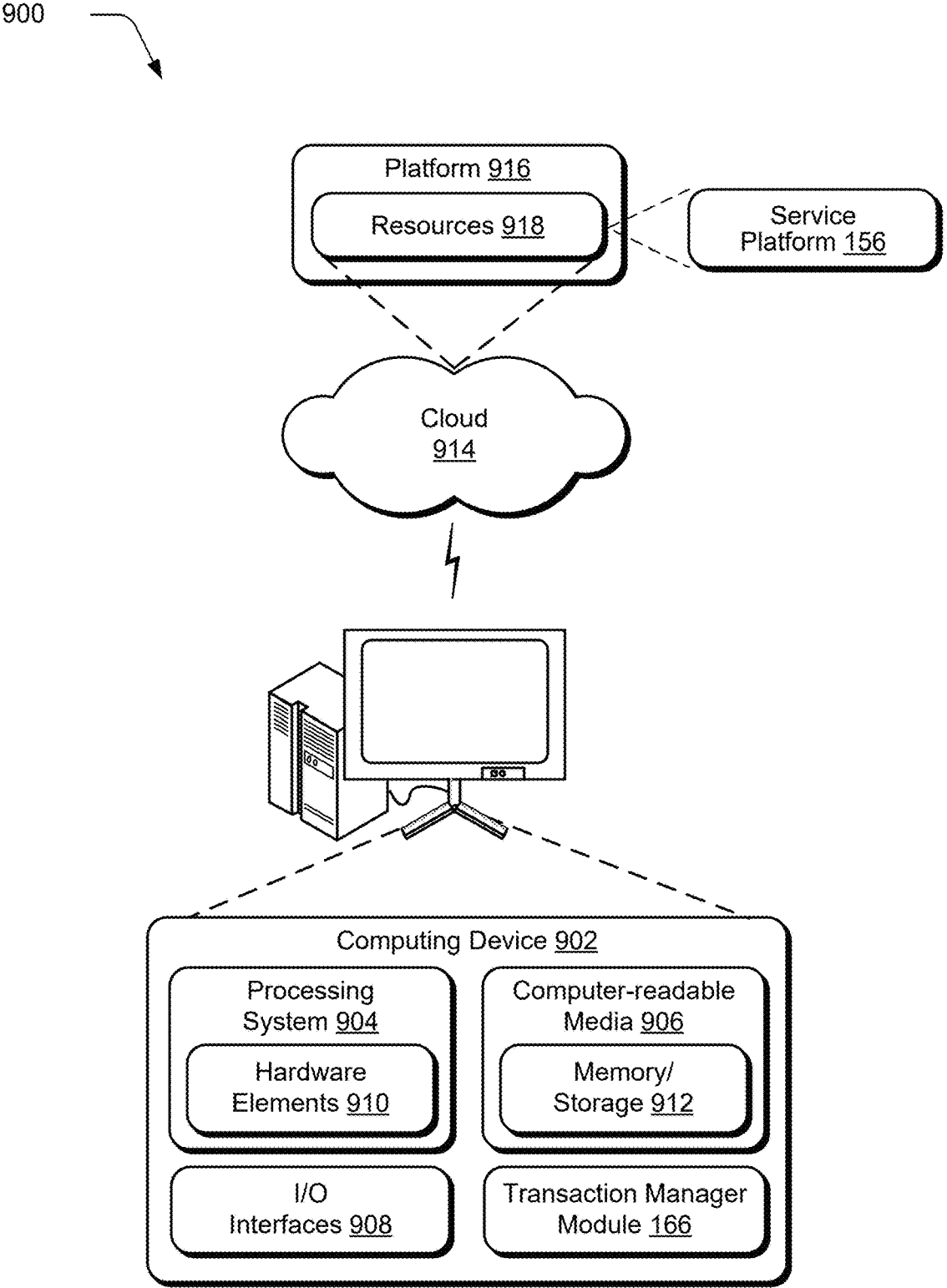
FIG. 9 illustrates an example system including various components of an example device that can be implemented as any type of computing device as described and/or utilize with reference to FIGS. 1-9 to implement embodiments of the techniques described herein.

FIG. 9 illustrates an example system generally at 900 that includes an example computing device 902 that is representative of one or more computing systems and/or devices that may implement the various techniques described herein, such as the nodes of FIG. 1. This is illustrated through inclusion of the service platform 156 and the transaction manager module 166. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918, the resources 918 including service platform 156. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:

a transaction manager module implemented at least partially in hardware of a computing device to receive a first request to participate in a transaction using a first service provider account;

a reputation management module implemented at least partially in the hardware of the computing device to obtain a first reputation score for the first service provider account, the first reputation score generated based on a first amount of reputation tokens associated with a first blockchain account identifier associated with the first service provider account;

a reputation assessment module implemented at least partially in the hardware of the computing device to determine that the transaction is denied for the first service provider account by comparing the first reputation score with a threshold score associated with the transaction;

a transaction holding module implemented at least partially in the hardware of the computing device to place a hold on the transaction responsive to the determining that the transaction is denied for the first service provider account;

a cosigning management module implemented at least partially in the hardware of the computing device to receive an indication from a second service provider account usable to at least partially back an obligation of the first service provider account for the transaction;

a co-signer reputation management module implemented at least partially in the hardware of the computing device to obtain a second reputation score for the second service provider account, the second reputation score generated based on a second amount of reputation tokens associated with a second blockchain account identifier associated with the second service provider account;

an access determination module implemented at least partially in the hardware of the computing device to determine that the transaction is permitted by comparing the second reputation score with the threshold score associated with the transaction; and an access control module implemented at least partially in the hardware of the computing device to, responsive to determining that the transaction is permitted, provide access by the computing device to the first service provider account to participate in the transaction.

2. The system of claim 1, wherein:

the first reputation score further is generated based on a first transactional history of the first blockchain account identifier associated with the first service provider account; and the second reputation score is generated based on a second transactional history of the second blockchain account identifier associated with the second service provider account.

3. The system of claim 1, wherein the threshold score is selected from a plurality of threshold scores, each threshold score of the plurality of threshold scores corresponding to a type of transaction.

4. The system of claim 1, wherein the threshold score is generated based on a currency amount involved in the transaction.

5. The system of claim 1, wherein the determining that the transaction is denied further comprises determining that the first reputation score is lower than the threshold score.

6. The system of claim 1, wherein the reputation tokens are cryptographic utility tokens.

7. The system of claim 1, wherein the determining that the transaction is permitted further comprises comparing a combined reputation score of the first reputation score and the second reputation score with the threshold score associated with the transaction.

8. The system of claim 1, wherein the access determination module implemented at least partially in the hardware of the computing device to determine that the transaction is permitted further comprises configurations to:

transmit, to the second service provider account, a notification specifying a third amount of reputation tokens to be transferred as collateral for the first service provider account to participate in the transaction; and determine that a transfer of the third amount of reputation tokens from the second blockchain account identifier is complete.

9. The system of claim 8, further comprising a collateral management module implemented at least partially in the hardware of the computing device to:

determine a successful completion of the transaction; and return the collateral to the second blockchain account identifier associated with the second service provider account responsive to the determining of the successful completion of the transaction.

10. The system of claim 8, further comprising a collateral management module implemented at least partially in the hardware of the computing device to:

determine an unsuccessful completion of the transaction; and withhold return of the collateral to the second blockchain account identifier associated with the second service provider account responsive to the determining of the unsuccessful completion of the transaction.

11. The system of claim 9, further comprising the collateral management module implemented at least partially in the hardware of the computing device to transfer a fourth amount of reputation tokens to the second blockchain account identifier associated with the second service provider account responsive to the determining of the successful completion of the transaction.

12. A system comprising:

a transaction manager module implemented at least partially in hardware of a computing device to receive a request to participate in a transaction using a first service provider account;

a reputation management module implemented at least partially in the hardware of the computing device to determine a first amount of reputation tokens associated with a first blockchain account identifier associated with the first service provider account;

a reputation assessment module implemented at least partially in the hardware of the computing device to determine that the transaction is denied for the first service provider account by comparing the first amount of reputation tokens with a collateral associated with the transaction, wherein the collateral specifies a second amount of reputation tokens to be transferred as the collateral for the first service provider account to participate in the transaction;

a transaction holding module implemented at least partially in the hardware of the computing device to place a hold on the transaction responsive to the determining that the transaction is denied for the first service provider account;

a cosigning management module implemented at least partially in the hardware of the computing device to receive an indication from a second service provider account usable to at least partially back the collateral of the first service provider account for the transaction;

a collateral management module implemented at least partially in the hardware of the computing device to determine a transfer of the second amount of reputation tokens from at least a second blockchain account identifier associated with the second service provider account as the collateral; and an access control module implemented at least partially in the hardware of the computing device to provide access to the first service provider account to participate in the transaction.

13. The system of claim 12, wherein the collateral is based on at least a first reputation score affiliated with the first service provider account, the first reputation score generated based on the first amount of reputation tokens associated with the first blockchain account identifier associated with the first service provider account.

14. The system of claim 12, wherein the collateral is based on a currency amount involved in the transaction.

15. The system of claim 12, further comprising the collateral management module implemented at least partially in the hardware of the computing device to:

determine a successful completion of the transaction; and responsive to the determining of the successful completion of the transaction, return the collateral to at least the second blockchain account identifier that transferred the second amount of reputation tokens as the collateral.

16. The system of claim 12, further comprising the collateral management module implemented at least partially in the hardware of the computing device to:

determine an unsuccessful completion of the transaction; and withhold, responsive to the determining of the unsuccessful completion of the transaction, return of the second amount of reputation tokens of the collateral to at least the second blockchain account identifier that transferred the second amount of reputation tokens as the collateral.

17. The system of claim 15, further comprising the collateral management module implemented at least partially in the hardware of the computing device to, responsive to the determining of the successful completion of the transaction, transfer a third amount of reputation tokens as a reputation reward to the second blockchain account identifier associated with the second service provider account.

18. The system of claim 17, further comprising a reputation manager module implemented at least partially in the hardware of the computing device to generate a fourth reputation score affiliated with the second service provider account based on a fourth amount of reputation tokens associated with the second blockchain account identifier associated with the second service provider account, the fourth amount of reputation tokens including the third amount of reputation tokens transferred as the reputation reward.

19. A system comprising:

a transaction manager module implemented at least partially in hardware of a computing device to receive a first request to receive a first request to participate in a transaction using a first service provider account;

a reputation management module implemented at least partially in the hardware of the computing device to obtain a first reputation score for the first service provider account, the first reputation score generated based on a first amount of reputation tokens associated with a first blockchain account identifier associated with the first service provider account;

a reputation assessment module implemented at least partially in the hardware of the computing device to determine that the transaction is denied for the first service provider account by comparing the first reputation score with a threshold score associated with the transaction;

a transaction holding module implemented at least partially in the hardware of the computing device to place a hold on the transaction responsive to the determining that the transaction is denied for the first service provider account;

a cosigning management module implemented at least partially in the hardware of the computing device to receive an indication from a second service provider account usable to at least partially back an obligation of the first service provider account for the transaction;

a co-signer reputation management module implemented at least partially in the hardware of the computing device to obtain a second reputation score for the second service provider account, the second reputation score generated based on a second amount of reputation tokens associated with a second blockchain account identifier associated with the second service provider account;

an access determination module implemented at least partially in the hardware of the computing device to determine that the transaction is permitted by comparing the second reputation score and the first reputation score with the threshold score associated with the transaction; and an access control module implemented at least partially in the hardware of the computing device to, responsive to determining that the transaction is permitted, provide access to the first service provider account to participate in the transaction.

20. The system of claim 19, wherein the threshold score is based on a currency amount involved in the transaction.

* * * * *